US012771829B2

(12) United States Patent
Wang

(10) Patent No.: US 12,771,829 B2
(45) Date of Patent: Oct. 20, 2026

(54) INTRA PREDICTION METHOD AND DEVICE, DECODER, AND ENCODER

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/205,109

(22) Filed: Jun. 2, 2023

(65) Prior Publication Data

US 2023/0319265 A1 Oct. 5, 2023

Related U.S. Application Data

(63) Continuation of application No. PCT/CN2020/133692, filed on Dec. 3, 2020.

(51) Int. Cl.

| | |
|---|---|
| ***H04N 19/11*** | (2014.01) |
| ***H04N 19/105*** | (2014.01) |
| ***H04N 19/176*** | (2014.01) |
| ***H04N 19/593*** | (2014.01) |

(52) U.S. Cl.

CPC ........... *H04N 19/11* (2014.11); *H04N 19/105* (2014.11); *H04N 19/176* (2014.11); *H04N 19/593* (2014.11)

(58) Field of Classification Search

CPC .... H04N 19/105; H04N 19/11; H04N 19/176; H04N 19/593

See application file for complete search history.

(56) References Cited

U.S. PATENT DOCUMENTS 10,757,420 B2 8/2020 Zhang
2014/0010295 A1* 1/2014 Lu ........................ H04N 19/176 375/240.12
2015/0016516 A1* 1/2015 Saxena ................ H04N 19/593 375/240.12
2018/0376148 A1 12/2018 Zhang et al.
(Continued)

FOREIGN PATENT DOCUMENTS

CN 105979261 A 9/2016
CN 109640098 A 4/2019
(Continued)

OTHER PUBLICATIONS

"Bitwise Shift Operators" obtained from https://learn.microsoft.com/en-us/cpp/c-language/bitwise-shift-operators?view=msvc-170 (Year: 2023).*
(Continued)

*Primary Examiner* — Jeremiah C Hallenbeck-Huber
(74) *Attorney, Agent, or Firm* — BAYES PLLC

(57) ABSTRACT

An intra-frame prediction method and device, a decoder, and an encoder. The method comprises: performing intra prediction on a block to be processed by using two or more different intra prediction modes, to obtain two or more prediction blocks corresponding to the different intra prediction modes; and obtaining a target prediction block of the block to be processed based on weight matrices and the obtained two or more prediction blocks.

13 Claims, 9 Drawing Sheets

(56) References Cited

U.S. PATENT DOCUMENTS

| | | | | |
|---|---|---|---|---|
| 2018/0376149 | A1 | 12/2018 | Zhang et al. | |
| 2020/0236361 | A1 | 7/2020 | Jang et al. | |
| 2020/0366900 | A1 | 11/2020 | Jun et al. | |
| 2021/0006803 | A1* | 1/2021 | Zhang | H04N 19/176 |
| 2021/0195200 | A1* | 6/2021 | Chen | H04N 19/543 |
| 2022/0060701 | A1* | 2/2022 | Bordes | H04N 19/132 |
| 2022/0321890 | A1* | 10/2022 | Lim | H04N 19/176 |

FOREIGN PATENT DOCUMENTS

| | | | |
|---|---|---|---|
| CN | 110771163 | A | 2/2020 |
| CN | 111279699 | A | 6/2020 |
| CN | 111373755 | A | 7/2020 |
| CN | 111630858 | A | 9/2020 |
| EP | 3567860 | A1 | 11/2019 |
| JP | 2020156087 | A | 9/2020 |
| WO | 2019172676 | A1 | 9/2019 |
| WO | 2019217122 | A1 | 11/2019 |
| WO | 2020098780 | A1 | 5/2020 |
| WO | 2020098782 | A1 | 5/2020 |

OTHER PUBLICATIONS

Joint Video Experts Team (JVET) of ITU-T SG 16 WP 3 and ISO/IEC JTC 1/SC 29/WG 11, Document: JVET-M0454-v1, 13th Meeting: Marrakech, MA, Jan. 9-18, 2019, Title: CE10-related: Multi-Hypothesis Intra with Weighted Combination, Status: Input document to JVET, Purpose: Proposal, Author(s) or Contact(s): Andre Seixas Dias, Gosala Kulupana, Saverio Blasi.

International Search Report in the international application No. PCT/CN2020/133692, mailed on Jul. 26, 2021.

Written Opinion of the International Search Authority in the international application No. PCT/CN2020/133692, mailed on Jul. 26, 2021.

Joint Video Experts Team (JVET) of ITU-T SG 16 WP 3 and ISO/IEC JTC 1/SC 29, Document: JVET-T2001-v1, 20th Meeting, by teleconference, Oct. 7-16, 2020, Title: Versatile Video Coding Editorial Refinements on Draft 10, Status: Output document approved by JVET, Purpose: Draft text of video coding specification, Author(s) or Contact(s): Benjamin Bross, Jianle Chen, Shan Liu, Ye-Kui Wang, Source: Editors.

AVS N2865 AVS-P2 Phase 2 (WD5.0), AVS3—Part 2: Video, GB The national standard of the People's Republic of China, ICS 35. 040, L71, Aug. 14, 2020.

First Office Action of the Japanese application No. 2023-533963, issued on Dec. 6, 2024. 16 pages with English translation.

First Office Action of the Korean application No. 10-2023-7022446, issued on Feb. 5, 2026.

Notice of Allowance of the Japanese application No. 2023-533963, issued on Mar. 11, 2025.

* cited by examiner

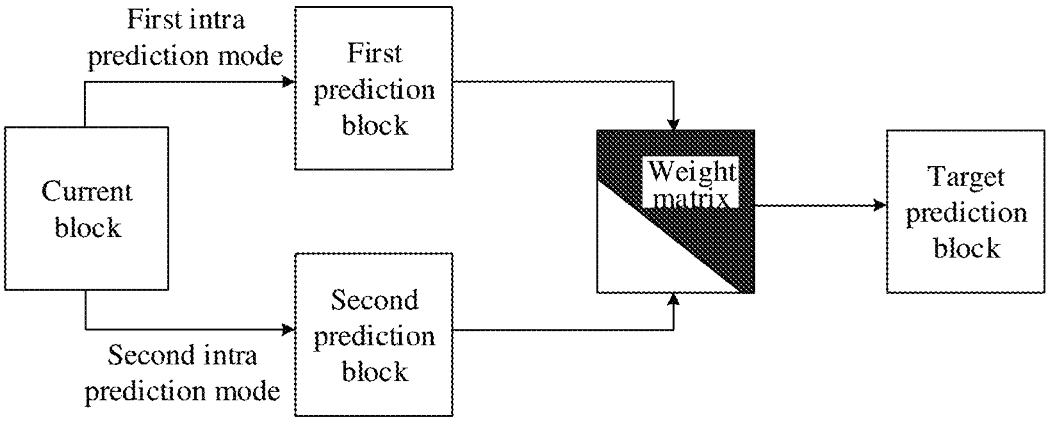
FIG. 8
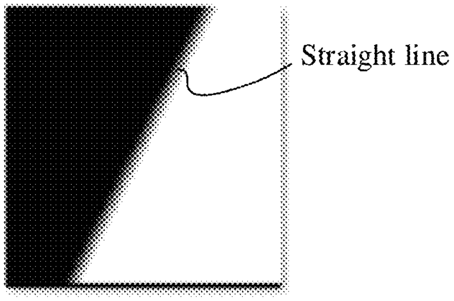
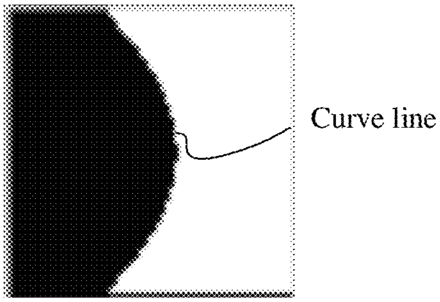
FIG. 9A
FIG. 9B

INTRA PREDICTION METHOD AND DEVICE, DECODER, AND ENCODER

CROSS-REFERENCE TO RELATED APPLICATION

This is a continuation of International Application No. PCT/CN2020/133692 filed on Dec. 3, 2020, which is hereby incorporated by reference in its entirety.

BACKGROUND

There is a strong correlation between adjacent pixels in a video picture, and spatial redundancy between adjacent pixels is eliminated through intra prediction in video coding technologies to improve coding efficiency.

The general intra prediction mode can predict simple textures, while complex textures either need to be partitioned into smaller blocks or encoded with more residuals, which undoubtedly increases the complexity of intra prediction. In other words, in the related intra prediction schemes, either the distortion cost is higher or the complexity is higher, which leads to lower quality of the intra prediction.

SUMMARY

An overview of the subject matter detailed in the disclosure is provided below, which is not intended to limit the protection scope of the claims.

Embodiments of the disclosure relate to video processing technologies, and provide an intra prediction method and device, a decoder, and an encoder, to improve the quality of intra prediction.

An embodiment of the disclosure provides an intra prediction method, applied to a decoder and including the following operations.

Intra prediction is performed on a block to be processed by using two or more different intra prediction modes, to obtain two or more prediction blocks corresponding to the different intra prediction modes.

A target prediction block of the block to be processed is obtained based on weight matrices and the obtained two or more prediction blocks.

An embodiment of the disclosure provides a computer readable storage medium, storing computer executable instructions for implementing the intra prediction method described above.

An embodiment of the disclosure provides a decoder, including a memory and a processor. The memory may store instructions executable for a processor for implementing the intra prediction method described above.

An embodiment of the disclosure provides a decoder, including a decoding module, a prediction module, and a combination module.

The decoding module may be configured to decode a received bitstream, to obtain two or more different intra prediction modes, a block to be processed, and weight matrices.

The prediction module may be configured to perform intra prediction on the block to be processed by using the two or more different intra prediction modes, to obtain two or more prediction blocks corresponding to the different intra prediction modes.

The combination module may be configured to obtain a target prediction block of the block to be processed based on the weight matrices and the obtained two or more prediction blocks.

An embodiment of the disclosure provides an intra prediction method, applied to an encoder and including the following operations.

Intra prediction is performed on a block to be processed by using two or more different intra prediction modes, to obtain two or more prediction blocks corresponding to the different intra prediction modes.

A target prediction block of the block to be processed is obtained based on weight matrices and the obtained two or more prediction blocks.

An embodiment of the disclosure provides a computer readable storage medium, storing computer executable instructions for implementing the above intra prediction method applied to the encoder.

An embodiment of the disclosure provides an encoder, including a memory and a processor. The memory stores instructions executable for a processor for implementing the above intra prediction method applied to the encoder.

An embodiment of the disclosure provides an encoder, including: a prediction module, a combination module, and a processing module.

The prediction module may be configured to perform intra prediction on the block to be processed by using two or more different intra prediction modes, to obtain two or more prediction blocks corresponding to the different intra prediction modes.

The combination module may be configured to obtain a target prediction block of the block to be processed based on weight matrices and the obtained two or more prediction blocks.

The processing module may be configured to: try all or part of possible combinations of prediction modes and weight matrix derivation modes, calculate loss costs and select a combination with a low loss cost; use two or more different intra prediction modes and weight matrices in the combination as the two or more different intra prediction modes and weight matrices for intra prediction; and write the determined two or more different intra prediction modes, weight matrix derivation modes and other information into a bitstream according to syntax.

An embodiment of the disclosure provides an intra prediction method, including the following operations.

Intra prediction is performed on a block to be processed by using two or more different intra prediction modes.

During prediction by using each intra prediction mode, when a preset number of pixels are predicted, a preset number of prediction pixels of the block to be processed are obtained based on a weight matrix and the pixels corresponding to the intra prediction mode that has been predicted.

A target prediction block of the block to be processed is obtained based on the preset number of obtained prediction pixels.

An embodiment of the disclosure provides an intra prediction device, including a prediction module and a combination module.

The prediction module may be configured to perform intra prediction on a block to be processed by using two or more different intra prediction modes obtained through decoding, to obtain two or more prediction blocks corresponding to the different intra prediction modes.

The combination module may be configured to obtain a target prediction block of the block to be processed based on weight matrices and the obtained two or more prediction blocks.

According to the intra prediction method and device, the encoder, and the decoder provided in the embodiments of the disclosure, intra prediction is performed on the block to be processed by using the two or more different intra prediction modes respectively, to obtain two or more prediction blocks; and then the obtained two or more prediction blocks are combined based on the weight matrices to obtain the prediction block of the block to be processed. In the embodiments of the disclosure, multiple prediction blocks are determined by using multiple intra prediction modes, thereby achieving prediction of complex textures. In this way, the quality of intra prediction is improved, and the compression performance is enhanced.

Further, in the intra prediction method provided in the embodiments of the disclosure, the prediction of more complex textures is guaranteed by diverse weight matrices. In this way, the quality of intra prediction is improved, and the compression performance is enhanced. In addition, the intra prediction method provided in the embodiments of the disclosure is applicable to more scenarios.

Other features and advantages of the disclosure will be illustrated in the following description, and some of these will become apparent from the description or be understood by implementing the disclosure. The objectives and other advantages of the disclosure can be implemented or obtained by structures specifically indicated in the description, claims, and accompanying drawings.

Other aspects of the disclosure are understandable upon reading and understanding of the accompanying drawings and detailed description.

BRIEF DESCRIPTION OF THE DRAWINGS

The drawings described herein are used to provide a further understanding of the disclosure and form a part of the disclosure. The schematic embodiments of the disclosure and the description thereof are used to explain the disclosure and do not constitute an improper limitation of the disclosure. In the drawings:

FIG. 8 is a schematic diagram of performing intra prediction by using two different intra prediction modes according to an embodiment of the disclosure;

FIG. 9A is a schematic diagram of positions at which weights change forming a straight line according to an embodiment of the disclosure;

FIG. 9B is a schematic diagram of positions at which weights change forming a curve line according to an embodiment of the disclosure;

DETAILED DESCRIPTION

The disclosure will be described in detail below with reference to the accompanying drawings and the embodiments. It should be noted that the embodiments in the disclosure and features in the embodiments may be combined with each other without conflicts.

Figure 6:
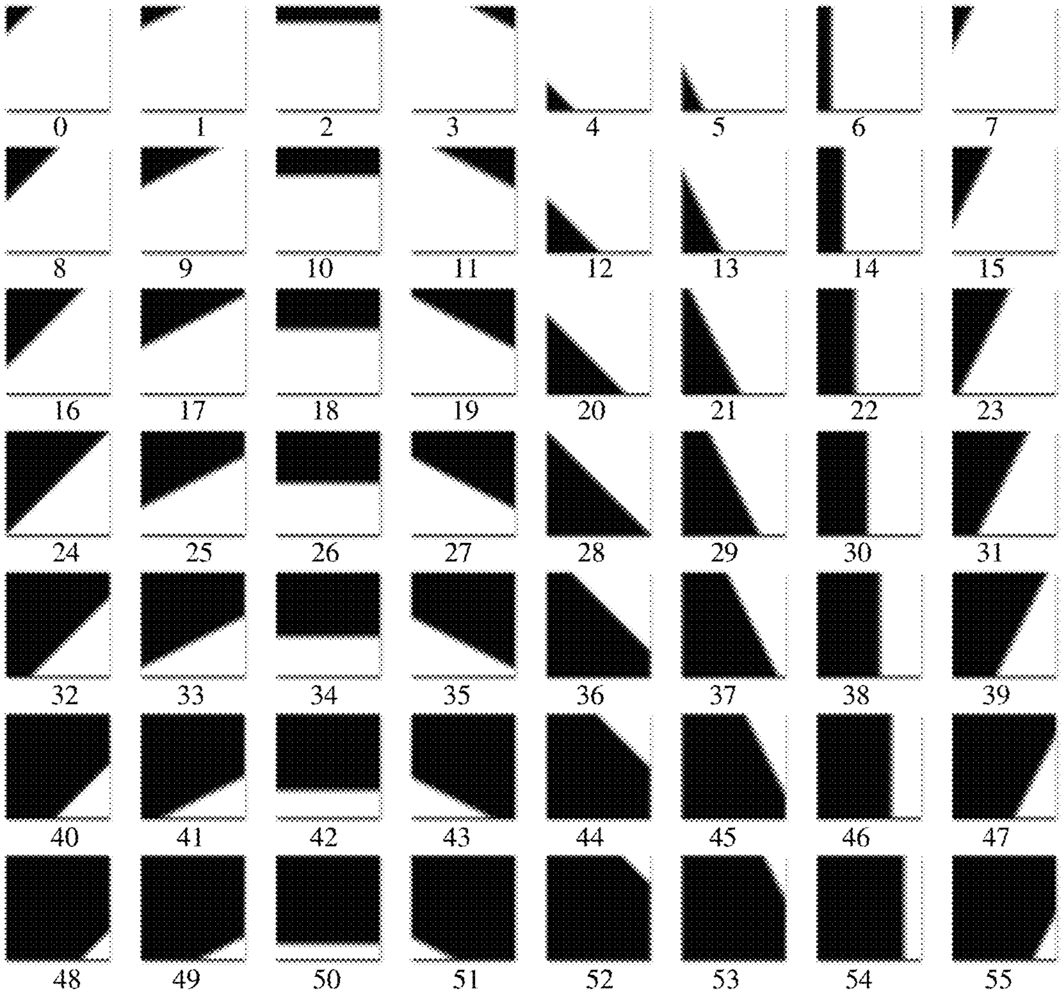
FIG. 6 illustrates weight diagrams of 56 modes of angular weighted prediction (AWP) on a square block according to an embodiment of the disclosure.

The intra prediction method provided in the embodiments of the disclosure is applicable to the basic process of a video codec under the block-based hybrid coding framework shown in FIG. 6(*a*), but is not limited to the framework and the process.

Figure 1A:
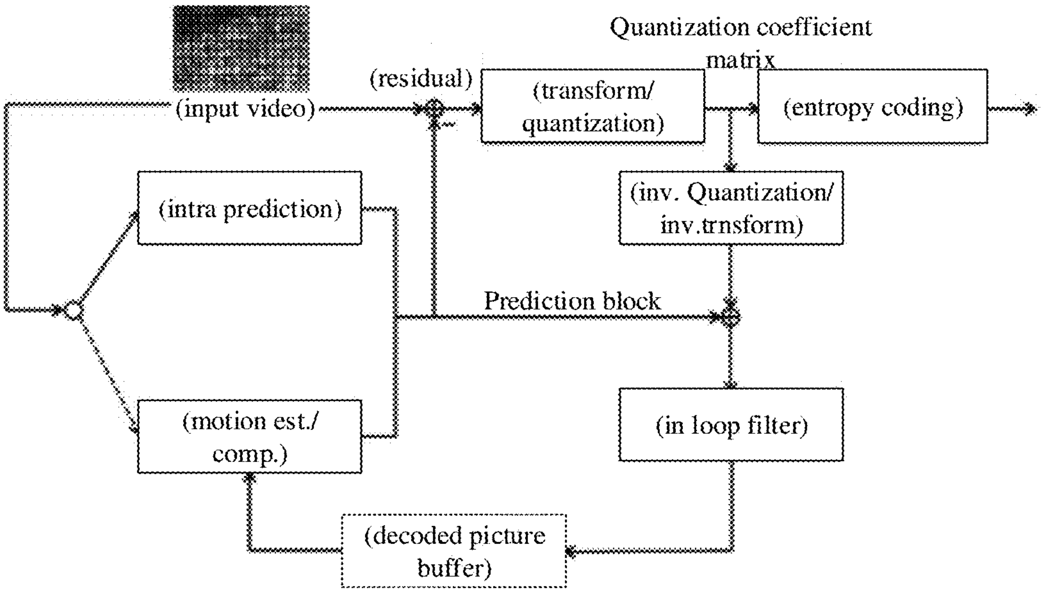
FIG. 1A is a schematic diagram of a block-based hybrid coding framework according to an embodiment of the disclosure.

The basic working principle of the video codec under the block-based hybrid coding framework shown in FIG. 1A is as follows. At the encoding end, a picture is partitioned into blocks, and intra prediction is performed on a current block to generate a prediction block of the current block. The prediction block is subtracted from an original block of the current block to obtain a residual block, the residual block is transformed and quantized to obtain a quantization coefficient matrix, and the quantization coefficient matrix is entropy encoded and output to a bitstream.

During block partitioning, each picture is partitioned into largest coding units (LCU) in squares of the same size (for example, 128×128, 64×64, or the like). Each LCU may be partitioned into rectangular coding units (CU) according to the rules. The CUs may further be partitioned into prediction units (PU), transform units (TU), or the like.

At the decoding end, intra prediction or inter prediction is performed on the current block to generate a prediction block of the current block on one hand. On the other hand, a bitstream is parsed to obtain the quantization coefficient matrix, inverse quantization and inverse transformation are performed on the quantization coefficient matrix to obtain a residual block, and the prediction block and the residual block are summed to obtain a reconstructed block. Reconstruction blocks form a reconstructed picture, and loop filtering is performed on the reconstructed picture based on the picture or the blocks, to obtain a decoded picture. Similar operations as the decoding end are performed at the encoding end to obtain the decoded picture. The decoded picture may be used as a reference picture for a subsequent picture during prediction. The decoded picture obtained at the encoding end is also referred to as a reconstructed picture. The current block may be partitioned into prediction units during prediction and into transform units during transformation, and the partitioning for prediction units and transform units may be different. The block partitioning information and mode information or parameter information such as prediction, transform, quantization, entropy coding, and loop filtering that are determined at the encoding end need to be output to the bitstream if necessary. The decoding end determines the same block partitioning information, mode information or parameter information such as prediction, transform, quantization, entropy coding, and loop filtering as the encoding end through parsing and analyzing based on existing information, so as to ensure that the decoded picture obtained by the encoding end is the same as the decoded picture obtained by the decoding end.

The intra prediction method provided in the embodiments of the disclosure is used for the intra prediction module in the framework shown in FIG. 1A, which may be applied to the encoding end or the decoding end. At the encoding end, the information such as the adopted intra prediction modes and weight matrices is determined, and then the intra prediction of the disclosure is performed based on the determined intra prediction modes and weight matrices. At the decoding end, the information such as the adopted intra prediction modes and weight matrices is obtained by decoding the bitstream, and then the intra prediction of the disclosure is performed based on the obtained intra prediction modes and weight matrices.

Figure 1B:
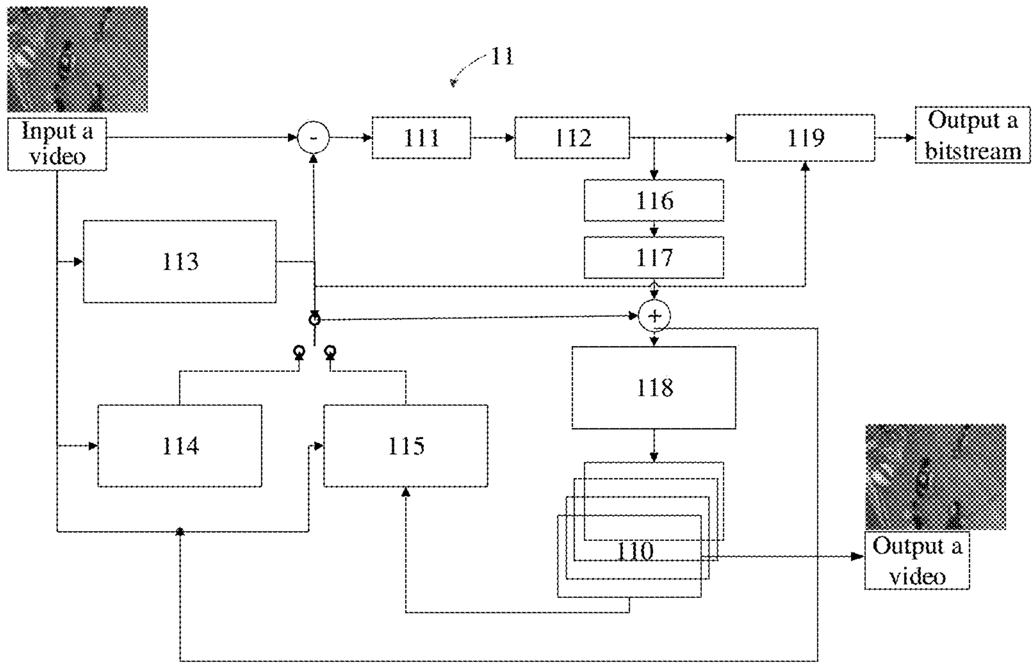
FIG. 1B is a schematic composition block diagram of a video coding system according to an embodiment of the disclosure.

FIG. 1B is a schematic composition block diagram of a video coding system according to an embodiment of the disclosure. As shown in FIG. 1B, the video coding system 11 may include: a transform unit 111, a quantization unit 112, a mode selection and coding control logic unit 113, an intra prediction unit 114, an inter prediction unit 115 (including motion compensation and motion estimation), an inverse quantization unit 116, an inverse transform unit 117, a loop filter unit 118, an coding unit 119, and a decoded picture buffer unit 110. An input original video signal is partitioned into coding tree units (CTU) to obtain a video reconstruction block. The mode selection and coding control logic unit 113 determines a coding mode. Then, residual pixel information obtained by intra or inter prediction is processed by the transform unit 111 and the quantization unit 112 to transform the video reconstructed block, including transforming the residual information from a pixel domain to a transform domain and quantizing an obtained transform coefficient to further reduce a bit rate. The intra prediction unit 114 is configured to perform intra prediction on the video reconstructed block. The intra prediction unit 114 is configured to determine an optimal intra prediction mode (i.e., target prediction mode) for the video reconstructed block. The inter prediction unit 115 is configured to perform inter prediction coding on the received video reconstructed block relative to one or more blocks in one or more reference pictures to provide time prediction information. Motion estimation is a process of generating a motion vector (MV), and a motion of the video reconstructed block may be estimated according to the MV. Then, motion compensation is performed based on the MV determined by motion estimation. After an inter prediction mode is determined, the inter prediction unit 115 is further configured to provide selected inter predicted data for the coding unit 119, and send MV data determined by calculation to the coding unit 119. In addition, the inverse quantization unit 116 and the inverse transform unit 117 are configured to reconstruct the video reconstructed block to reconstruct the residual block in the pixel domain. The loop filter unit 118 removes the square effect artifacts in the reconstructed residual block, and then, the reconstructed residual block is added to a prediction block in a picture in the decoded picture buffer unit 110 to generate the reconstructed video reconstruction block. The coding unit 119 is configured to encode various coding parameters and the quantized transform coefficients. The decoded picture buffer unit 110 is configured to store the reconstructed video reconstruction block for prediction reference. As video pictures are coded, new reconstructed video reconstructed blocks may be continuously generated, and all these reconstructed video reconstructed blocks are stored in the decoded picture buffer unit 110.

Figure 1C:
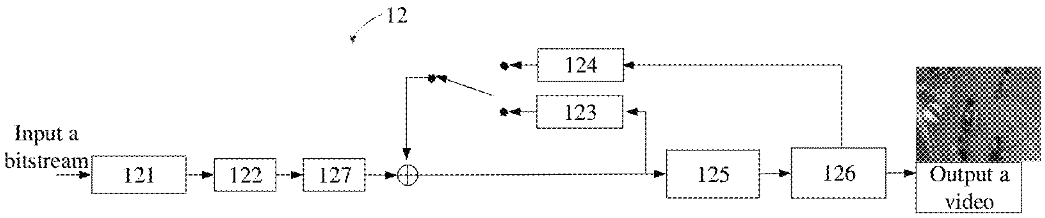
FIG. 1C is a schematic composition block diagram of a video decoding system according to an embodiment of the disclosure.

FIG. 1C is a schematic composition block diagram of a video decoding system according to an embodiment of the disclosure. As shown in FIG. 1C, the video decoding system 12 may include: a decoding unit 121, an inverse transform unit 127, an inverse quantization unit 122, an intra prediction unit 123, a motion compensation unit 124, a loop filter unit 125, and a decoded picture buffer unit 126. After an input video signal is encoded by the video coding system 11, a bitstream of the video signal is output. The bitstream is input to the video decoding system 12, and is processed by the decoding unit 121 first to obtain a decoded transform coefficient. The transform coefficient is processed by the inverse transform unit 127 and the inverse quantization unit 122 to generate a residual block in a pixel domain. The intra prediction unit 123 may be configured to generate prediction data of a current video decoding block based on a determined intra prediction direction and data of a previous decoded block from a current picture. The motion compensation unit 124 analyzes an MV and another associated syntactic element to determine prediction information for the video decoding block, and generates, by use of the prediction information, a prediction block of the video decoding block that is being decoded. The residual block from the inverse transform unit 127 and the inverse quantization unit 122 and the corresponding prediction block generated by the intra prediction unit 123 or the motion compensation unit 124 are summed to form a decoded video block. The loop filter unit 125 removes square effect artifacts of the decoded video signal, to improve the video quality. The decoded video block is then stored in the decoded picture buffer unit 126, and the decoded picture buffer unit 126 stores the reference picture for subsequent intra prediction or motion compensation, and also for the output of the video signal to obtain a recovered original video signal.

The intra prediction method provided in the embodiments of the disclosure is applied to the intra prediction unit 114 of the video coding system 11 and the intra prediction unit 123 of the video decoding system 12 to predict the current block (the block to be encoded or the block to be decoded), so as to obtain a corresponding prediction block. That is, the intra prediction method provided in the embodiments of the disclosure may be based on intra prediction in the video coding method or the video decoding method.

Figure 2:
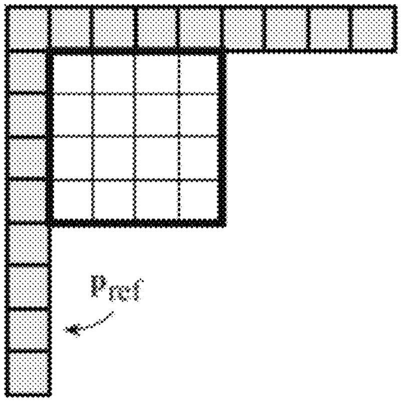
FIG. 2 is a schematic diagram of an intra prediction method according to an embodiment of the disclosure.
Figure 3:
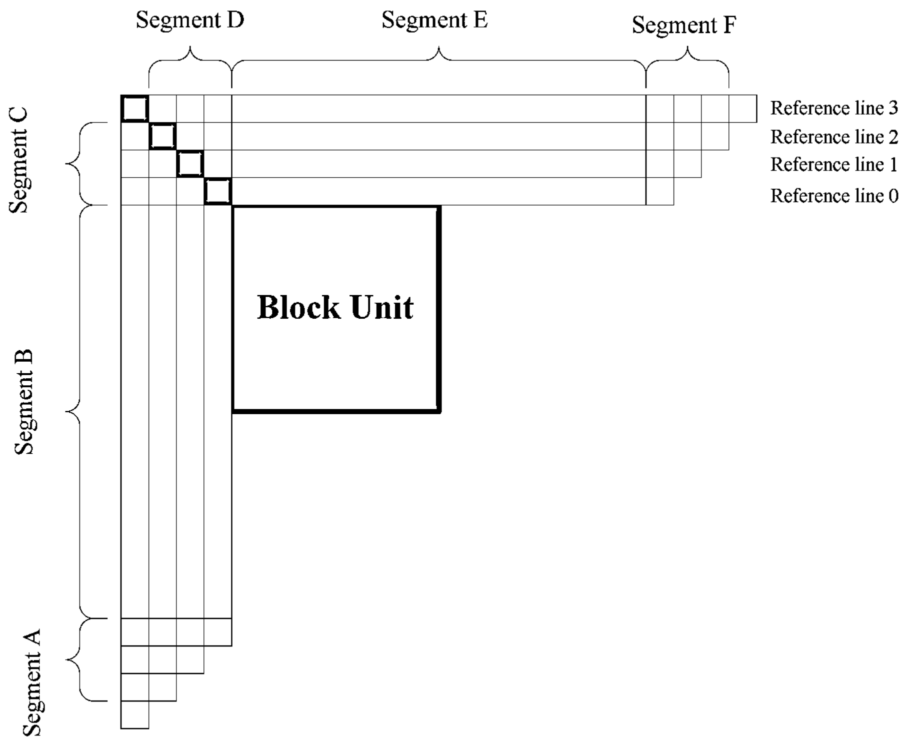
FIG. 3 is a schematic diagram of performing intra prediction by using four reference lines/columns according to an embodiment of the disclosure.

The intra prediction method is predicting a current block by using reconstructed pixels around the current block that have been encoded and decoded as reference pixels. For example, as shown in FIG. 2, the white 4×4 block is the current block, and the gray pixels in the left row and the upper column are reference pixels of the current block, and these reference pixels are used for predicting the current block during the intra prediction. These reference pixels may all be available, that is, have been encoded and decoded, or some of these reference pixels may not be available. For example, if the current block is at the leftmost of the whole picture, the reference pixels at the left of the current block are not available. Alternatively, if the bottom-left portion of the current block has not been encoded and decoded when the current block is encoded and decoded, the bottom-left reference pixels are not available. The reference pixels not available may be padded with available reference pixels or some values or some methods, or not padded. The multiple reference line (MRL) intra prediction method may use more reference pixels to improve coding efficiency. For example, FIG. 3 is a schematic diagram of an embodiment of intra prediction using four reference lines/columns in the related art.

Figure 4:
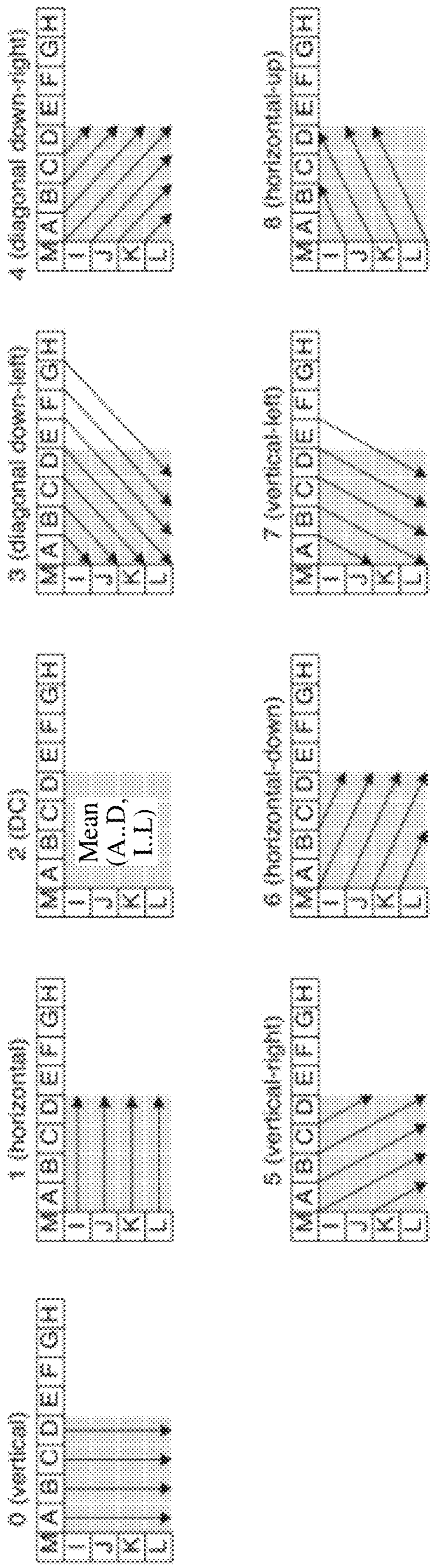
FIG. 4 is a schematic diagram of nine modes of intra prediction for a 4×4 block in H.264 according to an embodiment of the disclosure.

There are various intra prediction modes. FIG. 4 shows nine modes of intra prediction for a 4×4 block in H.264. In mode 0, pixels above the current block are copied in a vertical direction to the current block as prediction values; in mode 1, reference pixels on the left of the current block are copied in a horizontal direction as prediction values; in mode 2 DC, an average of eight points A to D and I to L is used as prediction values of all the points; in modes 3 to 8, reference pixels are copied at different angles to the corresponding points of the current block. Because some positions in the current block do not correspond exactly to reference pixels, a weighted average of the reference pixels, that is, sub-pixel interpolations of the reference pixels, may be used. In addition, there are plane, planar and other modes in the related art. With the development of technologies and the expansion of the blocks, the number of angular prediction modes is increasing. For example, High Efficiency Video Coding (HEVC) uses a total of 35 intra prediction modes, including a planar mode, a DC mode and 33 angular modes. For another example, Versatile Video Coding (VVC) uses a total of 67 prediction modes, including a planar mode, a DC mode and 65 angular modes. For another example, China audio video coding standard (AVS3) uses a total of 66 prediction modes, including a DC mode, a plane mode, a bilinear mode and 63 angular modes.

There are also techniques to improve intra prediction, such as improving a sub-pixel interpolation of a reference pixel and filtering a prediction pixel. For example, the Multiple Intra Prediction Filter (MIPF) in AVS3 uses different filters for different block sizes to generate prediction values. For pixels at different positions within the same block, a filter is used for pixels closer to the reference pixel to generate prediction values, and another filter is used for pixels away from the reference pixel to generate prediction values. Techniques for filtering the prediction pixels may include, for example, Intra Prediction Filter (IPF) in AVS3, which uses the reference pixels to filter the prediction values.

Intra prediction modes include a DC mode, a plane mode, a planar mode, a bilinear mode and the like. However, all of these modes can only predict simple textures. There are more and more angular modes, but these modes can only predict following a straight lines at one angle.

In the development of the VVC (also known as H.266) standard, the Geometric Partitioning Mode (GPM) was introduced as an inter prediction mode. In the development of AVS3, the Angular Weighted Prediction (AWP) was introduced as an inter prediction mode.

The GPM or AWP uses two reference blocks of the same size as the current block. 100% of pixel values of corresponding positions in the first reference block are used in some pixel locations, 100% of pixel values of corresponding positions in the second reference block are used in some pixel locations, and pixel values of corresponding positions in the two reference blocks are used in proportion in the blending area. The specific assignation of the weights is determined by the modes of the GPM or AWP. Alternatively, the GPM or AWP uses two reference blocks that are not of the same size as the current block, and a desired portion of each is used as a reference block. In other words, the portion with non-zero weights is used as a reference block, and the portion with zero weights is excluded.

Figure 5:
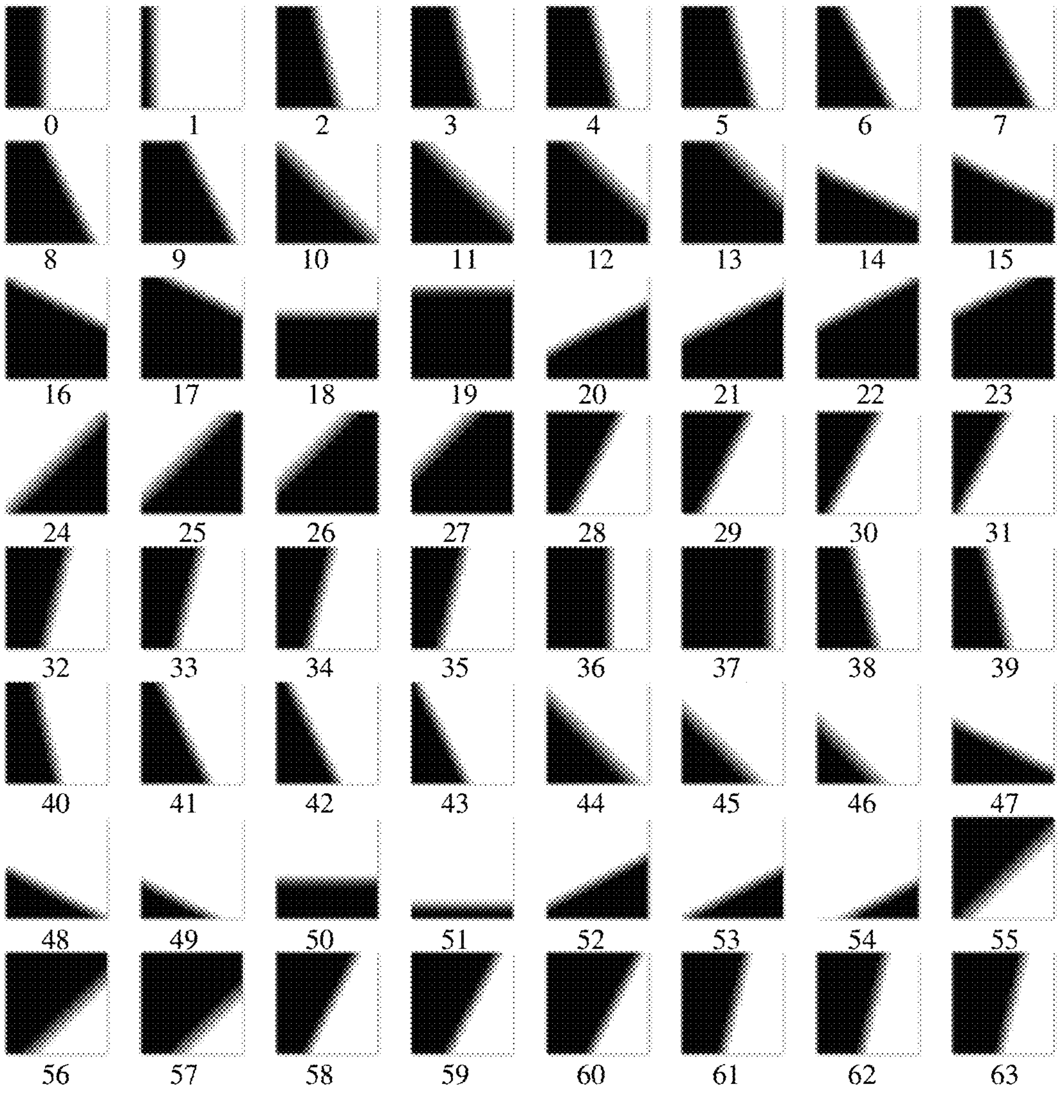
FIG. 5 illustrates weight diagrams of 64 modes of geometric partitioning mode (GPM) on a square block according to an embodiment of the disclosure.

FIG. 5 illustrates weight diagrams of 64 modes of GPM on a square block according to an embodiment of the disclosure. As shown in FIG. 5, black indicates that a weight of a corresponding position in a first reference block is 0%, white indicates that a weight of a corresponding position in the first reference block is 100%, and the gray area indicates that a weight of a corresponding position in the first reference block is greater than 0% and less than 100% depending on the color shade. A weight of a corresponding position in a second reference block is 100% minus a weight of the corresponding position in the first reference block.

FIG. 6 illustrates weight diagrams of 56 modes of AWP on a square block according to an embodiment of the disclosure. As shown in FIG. 6, black indicates that a weight of a corresponding position in a first reference block is 0%, white indicates that a weight of a corresponding position in the first reference block is 100%, and the gray area indicates that a weight of a corresponding position in the first reference block is greater than 0% and less than 100% depending on the color shade. A weight of a corresponding position in a second reference block is 100% minus a weight of the corresponding position in the first reference block.

Weight derivation methods of GPM and AWP are different. GPM determines an angle and offset for each mode, and then calculates a weight matrix for each mode. AWP first makes a one-dimensional line of weights, and then spreads the one-dimensional line of weights over the entire matrix using a method similar to the intra angular prediction.

Only rectangular partitioning for CUs, PUs or TUs exists in the earlier coding and decoding technologies, while GPM and AWP achieve the effect of non-rectangular partitioning for prediction without actual partitioning. GPM and AWP use a mask of weights of the two reference blocks, that is, the above-mentioned weight diagram. This mask determines weights of the two reference blocks when generating a prediction block, or it may be understood simply that some positions in the prediction block are derived from the first reference block and some from the second reference block, while the blending area is obtained by weighting corresponding positions in the two reference blocks, thus achieving smoother blending. GPM and AWP do not partition the current block into two CUs or PUs by the partitioning line, such that transformation, quantization, inverse transformation, and inverse quantization of the residuals after prediction are also performed on the current block as a whole.

The intra prediction method provided in the embodiments of the disclosure may include the following operations. Intra prediction is performed on a block to be processed by using two or more different intra prediction modes, to obtain two or more prediction blocks corresponding to the different intra prediction modes. A prediction block of the block to be processed is obtained by combining the obtained two or more prediction blocks based on weight matrices. In the embodiments of the disclosure, multiple prediction blocks are determined by using multiple intra prediction modes, thereby achieving prediction of complex textures. In this way, the quality of intra prediction is improved, and the compression performance is enhanced.

Further, in the intra prediction method provided in the embodiments of the disclosure, the prediction of more complex textures is guaranteed by diverse weight matrices. In this way, the quality of intra prediction is improved, and the compression performance is enhanced, and further, the intra prediction method provided in the embodiments of the disclosure is applicable to more scenarios.

Figure 7:
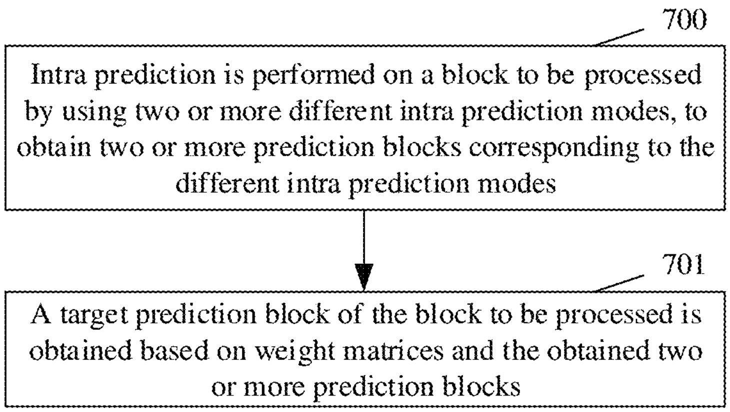
FIG. 7 is a schematic flowchart of an intra prediction method according to an embodiment of the disclosure.

FIG. 7 is a schematic flowchart of an intra prediction method according to an embodiment of the disclosure. As shown in FIG. 7, the method includes the following operations.

In 700, intra prediction is performed on a block to be processed by using two or more different intra prediction modes respectively, to obtain two or more prediction blocks corresponding to the different intra prediction modes.

In this embodiment of the disclosure, the block to be processed may be a block to be encoded that is processed by an encoder or a block to be decoded that is processed by a decoder.

In an exemplary embodiment, the intra prediction modes may include, but are not limited to, a DC mode, a planar mode, a plane mode, a bilinear mode, an angular prediction (AP) mode, and other intra prediction modes, as well as techniques for improving the intra prediction, for example, improving a sub-pixel interpolation of a reference pixel, or filtering a prediction pixel, such as MIPF and IPF.

An intra prediction mode that generates the prediction block independently of other intra prediction modes is referred to as a first intra prediction mode (or a basic intra prediction mode in the disclosure), and may include a DC mode, a planar mode, a plane mode, a bilinear mode and an AP mode. In other words, for the basic intra prediction mode, if the reference pixel and the basic intra prediction mode are determined, the prediction block can be determined. An intra prediction mode that depends on a basic intra prediction mode to determine a prediction block is referred to as a second intra prediction mode (or an improved intra prediction mode in the disclosure), and may include techniques such as MIPF and IPF that improve the intra prediction. In other words, the improved intra prediction modes cannot generate the prediction block independently. For example, a basic intra prediction mode such as an AP mode may generate a prediction block based on reference pixels, while an improved intra prediction mode such as MIPF may generate or determine a prediction block by using different filters for pixels at different positions based on the above-mentioned AP mode.

In an exemplary embodiment, the two or more different intra prediction modes include at least one basic intra prediction mode.

In an exemplary embodiment, taking two different intra prediction modes being used to perform intra prediction on the block to be processed as an example, the two different intra prediction modes are both basic intra prediction modes.

In an exemplary embodiment, the basic intra prediction mode is used together with the improved intra prediction mode, that is, the basic intra prediction mode adopted may be further combined with the improved intra prediction mode to predict the block to be processed.

In an exemplary embodiment, taking two different intra prediction modes being used to predict the block to be processed as an example, the two different intra prediction modes include one basic intra prediction mode and one improved intra prediction mode. For example, the first intra prediction mode and the second intra prediction mode use the same AP mode, but the first intra prediction mode does not use an improved intra prediction mode, for example, IPF not using the improved intra prediction mode, and the second intra prediction mode uses the improved intra prediction mode, for example, IPF using the improved intra prediction mode. For another example, both the first intra prediction mode and the second intra prediction mode use the same AP mode, but the first intra prediction mode uses one option of an improved intra prediction mode, and the second intra prediction mode uses another option of this improved intra prediction mode.

In the embodiments of the disclosure, at least two different intra prediction modes are used for prediction of the block to be processed, such that the prediction of the block to be processed can be performed from multiple perspectives, which is suitable for the prediction of complex textures and facilitates to improve the quality of intra prediction.

The process of the above intra prediction method is applicable to the encoder as well as to the decoder.

In an exemplary embodiment, at the decoder end, the block to be processed is a block to be decoded, and before the operation in 700, the method may further include the following operation.

A bitstream is parsed to obtain the two or more different intra prediction modes, the block to be processed, and weight matrices.

In an exemplary embodiment, at the encoder end, before the operation in 700, the method may further include the following operation.

All or some possible combinations of prediction modes and weight matrix derivation modes are tried, lost costs of the combinations are calculated, and a combination with a low loss cost is selected; and two or more different intra prediction modes and weight matrices in the combination are used as the two or more different intra prediction modes and the weight matrices for intra prediction.

The method may further include the following operation. Information such as the determined two or more different intra prediction modes and weight matrix derivation modes is written into a bitstream according to syntax.

All possible combinations herein may include: all combinations of all possible first intra prediction modes, all possible second intra prediction modes, and all possible weight matrix derivation modes. For example, assuming that there are 66 available intra prediction modes in total, there are 66 possible first intra prediction modes, the second intra prediction mode is definitely not the same as the first intra prediction mode, and thus there are 65 possibilities. There are 56 weight matrix derivation modes (in the case of AWP). Thus, the total number of combinations of any two different intra prediction modes and any one weight matrix derivation mode is $66\times65\times56$.

In an exemplary embodiment, the method to calculate the loss costs may include one or any combination of the following algorithms sum of absolute differences (SAD), sum of absolute transformed difference (SATD), or rate distortion optimization (RDO).

In an exemplary embodiment, first screening such as coarse screening is performed by using SATD and/or SAD to determine candidate combinations from all or some possible combinations of the prediction modes and weight matrix derivation modes; and then second screening such as fine screening is performed using RDO to determine a combination with a minimum loss cost from the candidate combinations.

In an embodiment, coarse screening may further include: using some fast algorithms to reduce the times of trying. For example, when an angular intra prediction mode causes a high cost, a preset number of intra prediction modes adjacent to the angular intra prediction mode are no longer tried.

In an exemplary embodiment, before the combinations of the prediction modes and the weight matrix derivation modes are tried, the method may further include the following operation.

The texture of the current block to be processed is analyzed, for example using gradients.

The operation that the combinations of the prediction modes and the weight matrix derivation modes are tried may further include the following operation.

The intra prediction modes to be tried are determined based on the analysis result of the texture.

For example, in a direction with a stronger texture (for example, greater than a preset high threshold) of the current block to be processed, during coarse screening for trying the combinations of the prediction modes and the weight matrix derivation modes, intra prediction modes in similar directions (that is, the direction plus or minus a preset angle) with a strong texture are selected for trying as many as possible. For another example, in a direction with a weaker texture (for example, less than a preset low threshold) of the current block to be processed, intra prediction modes in similar directions with a weaker texture are not selected for trying as many as possible.

It should be noted that the loss cost includes not only a cost of code words occupied in the bitstream by the first intra prediction mode, the second intra prediction mode, and the weight matrix derivation modes, but also a cost of flags and quantization coefficients to be transmitted in the bitstream for transform, quantization, entropy coding, or the like of prediction residuals, and a distortion cost of reconstructed blocks. Generally speaking, the cost is not the occupied space, but refers to the distortion cost, that is, the difference between the prediction block and the original block, or the distortion difference between the original picture and the picture obtained after encoding or decoding. The minimum cost means the least distortion, i.e., the least loss in the compression process and the highest coding quality.

In an exemplary embodiment, after determining the combination with the minimum loss cost, before the operation in 700, the method may further include the following operation.

If the selected minimum loss cost is less than or equal to the costs of other prediction modes, and the other prediction modes may include other intra prediction modes or inter prediction modes, the encoder selects the intra prediction modes in the combination with the minimum loss cost selected according to the disclosure as the prediction modes for the block to be processed; if the selected minimum loss cost is greater than the costs of other prediction modes, the encoder selects some other prediction modes as the prediction modes for the block to be processed.

In an exemplary embodiment, the method at the encoder end may further include the following operation.

Information such as the determined two or more different intra prediction modes and weight matrix derivation modes are written into a bitstream according to syntax.

The method may further include the following operation. Intra prediction and subsequent coding processing are performed on the block to be processed based on the determined two or more different intra prediction modes and weight matrices according to the intra prediction method of the disclosure.

In 701, a target prediction block of the block to be processed is obtained based on weight matrices and the obtained two or more prediction blocks.

In an exemplary embodiment, at the coding end, the weight matrices may be determined by calculating the loss cost as described in 700. At the decoding end, the bitstream is parsed based on the syntax and the weight matrices are obtained based on the obtained weight matrix derivation modes.

The weight matrix may be determined with reference to the weight derivation method of GPM or AWP in inter prediction. If the prediction mode of GPM or AWP is used in the same codec standard or codec, the weight derivation method of GPM or AWP may be used to determine the weight matrix in this embodiment of the disclosure, such that some of the same logic can be reused. For example, if inter prediction in AVS3 uses AWP, a weight derivation method of AWP may be used to determine the weight matrix in this embodiment of the disclosure. The method for determining the weight matrix in this embodiment of the disclosure may also be different from the method of GPM or AWP used in the same codec standard or codec. For example, a different number of modes, a different blending area algorithm, or a different parameter may be used.

In an exemplary embodiment, as shown in FIG. 8, taking that intra prediction is performed on the block to be processed by using two different intra prediction modes to obtain a first prediction block and a second prediction block as an example, the operation in 701 may include the following operations.

A first product of a matrix corresponding to the first prediction block and the first weight matrix and a second product of a matrix corresponding to the second prediction block and the second weight matrix are calculated.

A sum of the first product, the second product and a preset value is calculated.

The calculated sum is normalized to obtain the target prediction block.

In an exemplary embodiment, the second weight matrix is a difference between the maximum weight (for example, 8) and the first weight matrix.

The normalization process may include: right shifting the calculated sum by a preset number of bits (for example, 3 bits), to obtain the target prediction block of the block to be processed.

For example, a value of an element predMatrixSawp[x][y] in predMatrixSawp=((predMatrix0[x][y]*AwpWeightArrayY[x][y]+predMatrix1[x][y]*(8−AwpWeightArrayY[x][y])+4)>>3). predMatrixSawp indicates the target prediction block, predMatrixSawp[x][y] indicates a matrix of the target prediction block, predMatrix0[x][y] indicates a matrix corresponding to the first prediction block, predMatrix1[x][y] indicates a matrix corresponding to the second prediction block, and AwpWeightArrayY[x][y] indicates the first weight matrix.

In an embodiment, after the operation in 701, the method may further include the following operation.

Intra prediction is performed on the target prediction block of the block to be processed by using an improved intra prediction mode, and a prediction result is used as the target prediction block of the block to be processed.

In an exemplary embodiment, in all the possible weight matrices determined, not all points in each of the weight matrices have the same weight. In other words, at least one of all the possible weight matrices includes at least two different weights.

In an exemplary embodiment, all the possible weight matrices include at least two different weights.

In an exemplary embodiment, at least one of all the possible weight matrices includes at least two different weights, and at least one of all the possible weight matrices includes only the same weights. For example, if the minimum weight is 0 and the maximum weight is 8, in a weight matrix, some points have a weight of 0 and some points have a weight of 8; in another weight matrix, all points have a weight of 4. A weight matrix including only the same weights may have any value greater than the minimum weight and less than the maximum weight.

In an exemplary embodiment, for one or more weight matrices including at least two different weights, according to a minimum weight and a maximum weight, each point in the block to be processed is obtained by weighting prediction values derived from two intra prediction modes. For example, there are eight values for the weights, that is, 0 to 8. For example, if intra prediction is performed on the block to be processed by using two different intra prediction modes respectively, 0 indicates that the point is derived exclusively from a prediction value derived from an intra prediction mode, and 8 indicates that the point is derived exclusively from a prediction value derived from the other intra prediction mode. Assuming that the minimum weight is set to 1 and the maximum weight is set to 7, all points in this weight matrix are obtained by weighting the prediction values derived from the two intra prediction modes. However, not all points have the same weight.

In an exemplary embodiment, intra prediction is performed on the block to be processed by using two different intra prediction modes, and only one of all the possible weight matrices includes only two types of weights, one type of weights indicates that a prediction value of a corresponding point is derived exclusively from a value of the corresponding point in the first prediction block, and the other type of weights indicates that a prediction value of a corresponding point is derived exclusively from a value of the corresponding point in the second prediction block. For example, the two types of weights are 0 and 1.

In an exemplary embodiment, intra prediction is performed on the block to be decoded by using two different intra prediction modes, one of all the possible weight matrices includes a plurality of types of weights. A maximum weight and a minimum weight (for example, 0) of the weights respectively indicate that prediction values of corresponding points are derived exclusively from values of the corresponding points in the first prediction block and values of the corresponding points in the second prediction block; and a weight other than the maximum weight or the minimum weight indicates that a prediction value of a corresponding point is derived from a weighted average of values of the corresponding point in the first prediction block and the corresponding point in the second prediction block. An area consisting of the weights other than the maximum value or the minimum value may be referred to as a blending area.

In an exemplary embodiment, as shown in FIG. 9A, in all the possible weight matrices, if a weight matrix includes only two types of weights, positions at which the weights change form a straight line; if a weight matrix includes multiple types of weights, positions with the same weights in the blending area form a straight line. In an embodiment, the above straight lines are all horizontal-vertical, or the above straight lines are not all horizontal-vertical.

In an exemplary embodiment, as shown in FIG. 9B, in all the possible weight matrices, if a weight matrix includes only two types of weights, positions at which the weights change form a curve line; if a weight matrix includes multiple types of weights, positions with the same weights in the blending area form a curve line.

The diverse weight matrices provided in the embodiments of the disclosure guarantee the prediction of more diverse prediction blocks and enable the intra prediction method provided in the embodiments of the disclosure to be applicable to more scenarios.

In an embodiment, for example, AWP is used in AVS3 for inter prediction, and includes 56 weight matrices. In an embodiment of the disclosure, 64 weight matrices are used in intra prediction, in which 56 weight matrices are the same as the weight matrices of AWP. For example, the first 56 weight matrices are the same as the weight matrices of AWP, and each of the remaining eight weight matrices includes only one type of weights, that is, 1, 2, . . . , 7, and 8 respectively. For the eight weight matrices, the total weight is 16, that is, a weight of 1 indicates 1:15 weighting and a weight of 2 indicates 2:14 weighting. In this way, when the mode numbers of the 64 weight matrices are binarized, a code word of six bits can be used for each weight matrix. Alternatively, the total weight is 8. In such case, 8 is the maximum weight, that is, a weight of 1 indicates 1:7 weighting and a weight of 2 indicates 2:6 weighting.

Because inter prediction utilizes correlation in the time domain, the reconstructed picture in the reference picture is used as the reference block. The intra prediction uses the correlation in the space domain, and the reconstructed pixels around the block to be processed are used as the reference pixels. The closer distance in the space domain indicates a stronger correlation, and the farther distance indicates a worse correlation. Therefore, if a weight matrix makes pixel positions used for a prediction block all far away from the reference pixels, such a weight matrix may not be used in the embodiments of the disclosure, to ensure the effect of intra prediction.

In an exemplary embodiment, the size of the block (for example, the block to be processed) in the intra prediction method provided in the embodiments of the disclosure may include, but is not limited to the following.

A width of the block is greater than or equal to a first threshold TH1, a height of the block is greater than or equal to a second threshold TH2, and the first threshold TH1 and the second threshold TH2 may be 8, 16, 32, 64, 128, or the like. The first threshold TH1 may be equal to the second threshold TH2, for example, the first threshold TH1=the second threshold TH2=8. Alternatively, a number of pixels of the block is greater than or equal to a third threshold TH3, and the third threshold TH3 may be 8, 16, 32, 64, 128, or the like.

Alternatively, the width of the block is less than or equal to a fourth threshold TH4, the height of the block is less than or equal to a fifth threshold TH5, and the fourth threshold TH4 and the fifth threshold TH5 may be 8, 16, 32, 64, 128, or the like. The fourth threshold TH4 may be equal to the fifth threshold TH5. Alternatively, a number of pixels of the block is less than or equal to the sixth threshold TH6, and the sixth threshold TH6 may be 8, 16, 32, 64, 128, or the like.

By limiting the size of the blocks, the impact of the complexity due to use of multiple prediction modes for prediction on the overall system is reduced, and the trade-off between compression performance and complexity is well achieved by discarding some blocks of inapplicable sizes, thus better ensuring the applicability of the disclosure.

In an exemplary embodiment, the partitioning of blocks becomes increasingly flexible as technology evolves. In addition to square blocks, the partitioning method may also support blocks with aspect ratios such as 1:2, 1:4, 1:8, 2:1, 4:1, 8:1, or the like. In the intra prediction method provided in the embodiments of the disclosure, the inventors of the disclosure found that blocks with some aspect ratios, or blocks with some sizes, such as blocks with 1:4 or 4:1, 1:8 or 8:1, 8×32, 8×64, 32×8, or 64×8, may not bring good or significant compression performance. In an embodiment of the disclosure, the size of the block may be set by setting the aspect ratio of the block. For example, the ratio of width to height is less than or equal to a preset ratio threshold THR, and the ratio of width to height is less than or equal to the ratio threshold THR.

In an exemplary embodiment, the size of the block, and the aspect ratio of the block may be set simultaneously. For example, the intra prediction method provided in the embodiments of the disclosure may be used if the size of the block satisfies: the height of the block is greater than or equal to 8, the width of the block is greater than or equal to 8, the ratio of the width to the height of the block is less than or equal to 4, and the ratio of the height to the width of the block is less than or equal to 4; otherwise, the intra prediction method provided in the embodiments of the disclosure is not used by default.

In an exemplary embodiment, at the encoder end, before the operation in 700 in the disclosure, the method may further include the following operation.

A picture-level flag is set, for indicating whether to use the intra prediction method in the embodiments of the disclosure for the current picture to be processed, that is, whether to proceed with the operation in 700, and the flag is written into the bitstream according to the syntax, such that the intra prediction method is performed at the decoder end based on the flag.

In an embodiment, if the intra prediction method in the embodiments of the disclosure is used for intra pictures (such as the I picture) but not used for inter pictures (such as B picture and P picture), when the flag indicates that the current picture to be processed is an intra picture, it indicates that the decoder end proceeds with the operation in 700; when the flag indicates that the current picture to be processed is an inter picture, it indicates that the decoder end exits from the process of the disclosure, and relevant techniques may be used for intra prediction.

For another example, if the intra prediction method in the embodiments of the disclosure is not used for intra pictures (such as the I picture) but used for inter pictures (such as the B picture and the P picture), when the flag indicates that the current picture to be processed is an intra picture, it indicates that the decoder end exits from the process of the disclosure, and relevant techniques may be used for intra prediction; when the flag indicates that the current picture to be processed is an inter picture, it indicates that the decoder end proceeds with the operation in 700.

For another example, if the method in the disclosure is used for some inter pictures but not used for other inter pictures, when the flag indicates that the current picture to be processed is of the some inter pictures, it indicates that the decoder end proceeds with the operation in 600; when the flag indicates that the current picture to be processed is of the other inter pictures, it indicates that the decoder end exits from the process of the disclosure, and relevant techniques may be used for intra prediction.

Correspondingly, at the decoder end, before the operation in 700 of the intra prediction method shown in FIG. 7, the method may further include: parsing the bitstream according to the syntax to obtain the flag.

For example, if the intra prediction method in the embodiments of the disclosure is used for intra pictures (such as the I picture) but not used for inter pictures (such as B picture and P picture), when the flag obtained through decoding indicates that the current picture to be processed is an intra picture, the operation in 700 is proceeded; when the flag obtained through decoding indicates that the current picture to be processed is an inter picture, the process of the disclosure ends, and relevant techniques may be used for intra prediction.

For another example, if the intra prediction method in the embodiments of the disclosure is not used for intra pictures (such as the I picture) but used for inter pictures (such as the B picture and the P picture), when the flag obtained through decoding indicates that the current picture to be processed is an intra picture, the process of the disclosure ends, and relevant techniques may be used for intra prediction; when the flag obtained through decoding indicates that the current picture to be processed is an inter picture, the operation in 700 is proceeded.

For another example, if the method in the disclosure is used for some inter pictures but not used for other inter pictures, when the flag obtained through decoding indicates that the current picture to be processed is of the some inter pictures, the operation in 700 is proceeded; when the flag obtained through decoding indicates that the current picture to be processed is of the other inter pictures, the process of the disclosure ends, and relevant techniques may be used for intra prediction.

In an exemplary embodiment, at the encoder end, before the operation in 700 of the disclosure, the method may further include the following operation.

A flag below a picture level and above a CU level (for example, tile, slice, patch, or LCU) is set for indicating whether the intra prediction method of the embodiments of the disclosure is used for an indicated area, and the flag is written into the bitstream according to the syntax, to instruct to perform the corresponding intra prediction method at the decoder end based on the flag.

By setting different levels of flags in the embodiments of the disclosure, on one hand, the optimal configuration is flexibly realized according to different application scenarios and video contents, and on the other hand, the bit rate is further reduced. For example, if there are multiple CUs in an LCU and none of the CUs uses the intra prediction method provided in the embodiments of the disclosure, only a LCU-level flag needs to be set to indicate that all the CUs in the LCU do not use the intra prediction method provided in the embodiments of the disclosure. In other words, there is no need to set a separate flag for each CU, that is, one flag, instead of N flags, is set.

Correspondingly, at the decoder end, before the operation in 700, the method may further include: parsing the bitstream according to the syntax to obtain the flag.

In an exemplary embodiment, at the encoder end, before the operation in 700 in the disclosure, the method may further include the following operation.

An improved prediction mode mutually exclusive with the intra prediction method provided in the embodiments of the disclosure is set, for better determining the intra prediction modes during the intra prediction process.

At the decoder end, the improved prediction mode set mutually exclusive with the intra prediction method provided in the embodiments of the disclosure is obtained by parsing the bitstream. If it is determined that the intra prediction method provided in the embodiments of the disclosure is performed on the block to be processed, the mutually-exclusive improved prediction mode is not used; or, if it is determined that the mutually-exclusive improved prediction mode is used for the block to be processed, the intra prediction method of the embodiments of the disclosure is not performed. By setting the mutually-exclusive improved prediction mode, it is not necessary to transmit a flag in the bitstream for indicating whether to use the mutually-exclusive improved prediction mode, such that unnecessary flag transmission in the bitstream is avoided and better compression performance is achieved in general.

In an exemplary embodiment, the mutually-exclusive improved prediction mode may include, for example, IPF and derived tree (DT).

For example, the mutually-exclusive improved prediction mode is DT, which is a technique in AVS3. DT can partition the current CU into rectangular PUs, and correspondingly, into smaller TUs. When the embodiments of the disclosure is performed in combination with DT, the intra prediction method provided in the embodiments of the disclosure maybe used in one or multiple PUs partitioned based on DT, but the complexity is increased. For example, the mutually-exclusive improved prediction mode is an improved intra prediction (IIP), which is a technique in AVS3, and IIP can use more complex filters to obtain prediction values.

The inventors of the disclosure found during testing of the intra prediction process provided in the embodiments of the disclosure that when using IIP, DT or IPF, the computation or complexity of the intra prediction is increased. Therefore, in the embodiments, by setting the mutually-exclusive relationship between these improved prediction modes and the intra prediction of the disclosure, the trade-off between performance and complexity is well achieved, thus better ensuring the applicability of the disclosure.

The intra prediction method in the disclosure and IPF are taken as an example to illustrate the mutual exclusion case.

Figure 10:
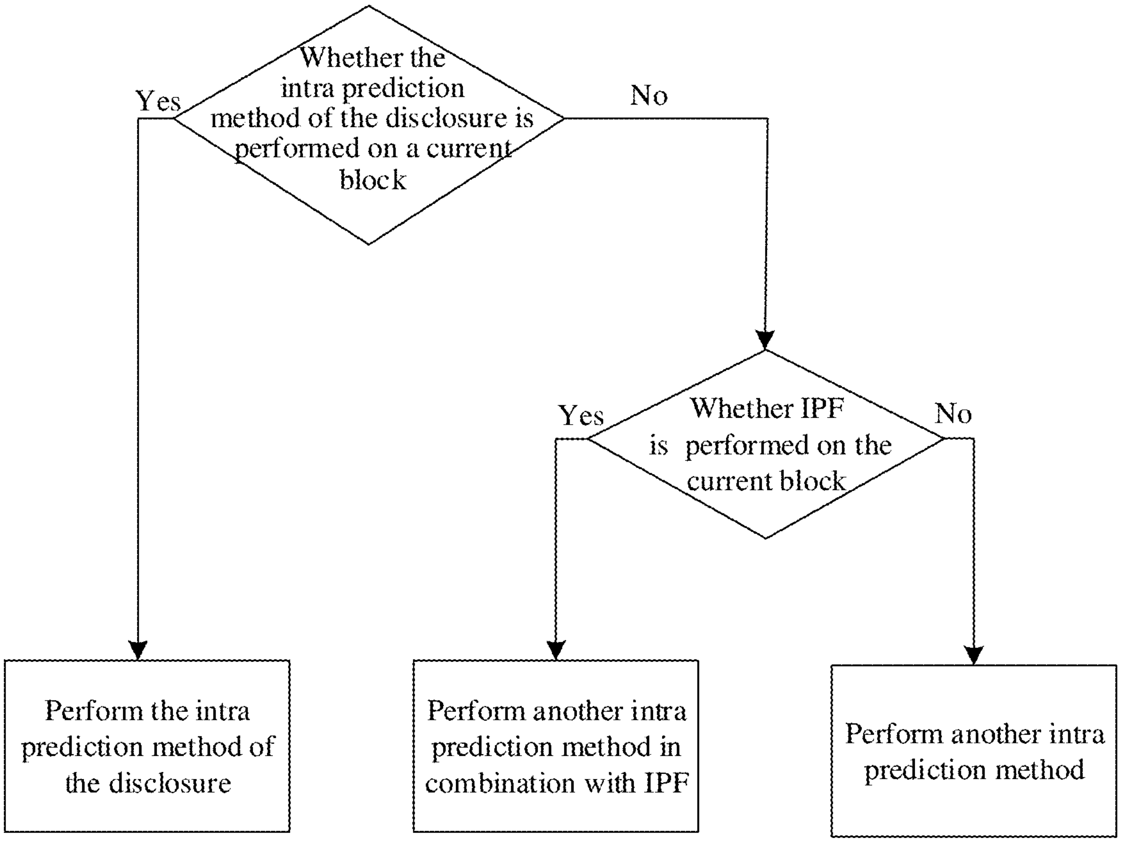
FIG. 10 is a schematic flowchart of a first embodiment of mutual exclusion processing according to the disclosure.

In an exemplary embodiment, it is assumed that the intra prediction method of the disclosure is mutually exclusive with the IPF, the flag used in the embodiments of the disclosure to indicate whether to perform the intra prediction method in the embodiments of the disclosure on the current picture to be processed is decoded first, and then the flag of the IPF is decoded. As shown in FIG. 10, the process mainly includes the following operations.

If the intra prediction method of the disclosure is used for the current block, there is no need to decode the flag of the IPF, that is, there is no need to transmit the flag of the IPF in the bitstream. If the intra prediction method of the disclosure is not used for the current block, the flag of the IPF is further decoded to determine whether the IPF needs to be used. If the current block uses the IPF, the current block is predicted by using the IPF in combination with another intra prediction method. If the current block does not use the IPF, the current block is predicted by using another intra prediction method.

Figure 11:
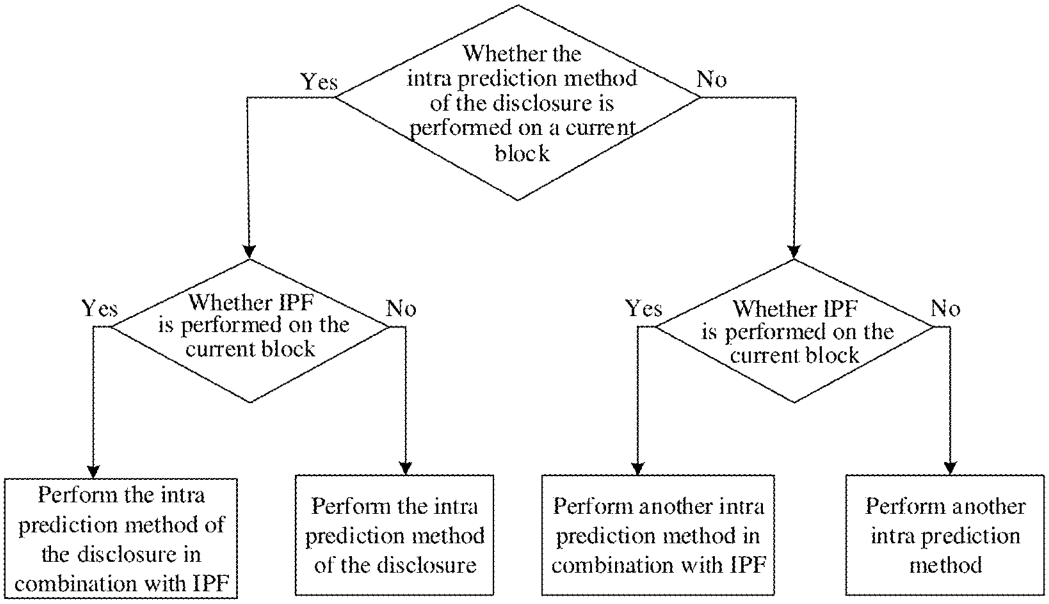
FIG. 11 is a schematic flowchart of a second embodiment of mutual exclusion processing according to the disclosure.

In an exemplary embodiment, it is assumed that the intra prediction method of the disclosure is not mutually exclusive with the IPF, the flag used in the embodiments of the disclosure to indicate whether to perform the intra prediction method in the embodiments of the disclosure on the current picture to be processed is decoded first, and then the flag of the IPF is decoded. As shown in FIG. 11, the process mainly includes the following operations.

The flag of the IPF needs to be decoded, regardless of whether the intra prediction method of the disclosure is used. In addition, if both the intra prediction method in the disclosure and the IPF are used, the current block is predicted by using the intra prediction method in the disclosure and the IPF.

It should be noted that the embodiments shown in FIG. 10 and FIG. 11 are only examples in which the intra prediction method in the disclosure is mutually exclusive with one technology. If the intra prediction method in the disclosure is also mutually exclusive with other technologies, the process is more complicated, but the principle is the same, which can be easily understood by a person skilled in the art based on the embodiments shown in FIG. 10 and FIG. 11 of the disclosure. Details are not described herein.

In an exemplary embodiment, the method of the embodiments of the disclosure may further include: storing intra prediction mode information used in intra prediction, for use in a coding and decoding process of a neighbouring block. For example, in an MPM mode, reference to an intra prediction mode of a neighbouring block is required. In other words, subsequent coding/decoding blocks of the current picture may use intra prediction modes of previous coded/decoded blocks, such as neighbouring blocks, based on the adjacent position relationship. A chroma block (coding unit) may use an intra prediction mode of a previous coded/decoded luma block (coding unit) based on a position relationship. The stored information is for the reference of the subsequent coding/decoding blocks. Because coding mode information in the same block (coding unit) can be directly obtained, but coding mode information in different blocks (coding units) cannot be directly obtained, the intra prediction mode information used in intra prediction needs to be stored. In this way, the information can be read for subsequent coding/decoding blocks based on the position.

In an exemplary embodiment, two different intra prediction modes are used to perform intra prediction on the block to be decoded respectively, and the operation that the intra prediction modes used in intra prediction are stored may include the following operation.

At least one minimum unit stores one of the two different intra prediction modes, and at least one minimum unit stores the other one of the two different intra prediction modes. That is, at least two minimum units store the different intra prediction modes. The minimum unit may be a preset matrix of a fixed size (for example, a 4×4 matrix). Each minimum unit stores one intra prediction mode. In this way, each time a block is coded/decoded, minimum units corresponding to the position of the block may be used to store intra prediction modes for the block.

Figure 12:
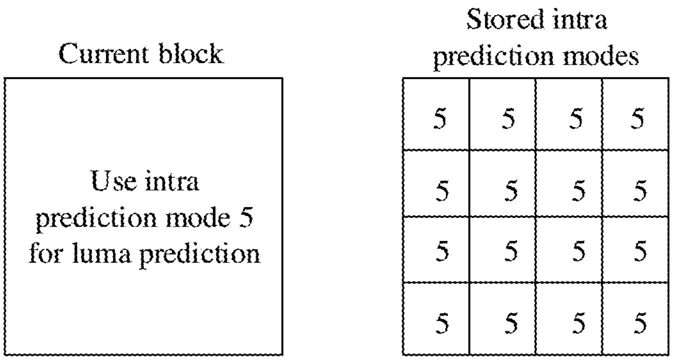
FIG. 12 is a schematic diagram of storing intra prediction modes according to an embodiment of the disclosure.

For example, as shown in FIG. 12, if an intra prediction mode 5 is used to perform luma prediction on a 16×16 current block, all 4×4 minimum units corresponding to the block store the intra prediction mode 5. Taking the YUV format as an example, generally, the luma intra prediction mode is stored, which may include a luma intra prediction mode of a block containing both a luma component and a chroma component, and a luma intra prediction mode of a block containing only a luma component.

For another example, in AVS3, the embodiments of the disclosure may store two different intra prediction modes using a logic similar to that used by AWP to store two different motion information. That is, if a position corresponding to a minimum unit only uses a prediction block determined by one of the two intra prediction modes, the minimum unit stores the intra prediction mode. If a position corresponding to a minimum unit only uses a prediction block determined by the other one of the two intra prediction modes, the minimum unit stores the other one intra prediction mode. If a position corresponding to a minimum unit uses both a prediction block determined by the first intra prediction mode and a prediction block determined by the second intra prediction mode, the minimum unit may store one of the two intra prediction modes according to a preset determining method. For example, for a minimum unit of 4×4, a point, for example, the point (2, 2) is selected, and if a weight of the first intra prediction mode at this point is greater than or equal to that of the second intra prediction mode, the first intra prediction mode is stored; otherwise, the second intra prediction mode is stored. For another example, a sum of weights of the first intra prediction mode and a sum of weights of the first intra prediction mode for all points in a block of the minimum unit are calculated, if the sum of weights of the first intra prediction mode is greater than or equal to the sum of weights of the second intra prediction mode, the first intra prediction mode is stored; otherwise, the second intra prediction mode is stored. The method of storing related information in GPM or AWP is used in the embodiments of the disclosure. In this way, a part of the same logic is reused.

In an exemplary embodiment, two different intra prediction modes are used to perform intra prediction on the block to be processed respectively, and the operation that the intra prediction modes used in intra prediction are stored may include the following operation.

The same intra prediction mode is selected and stored for all minimum units corresponding to the entire block to be processed. This reduces the complexity.

In an exemplary embodiment, the operation that the same intra prediction mode is selected and stored for all minimum units corresponding to the entire block to be processed may include the following operation.

It is determined whether all the minimum units of the block to be processed store one of the two intra prediction modes or the other one of the two intra prediction modes based on the weight matrix derivation modes obtained by parsing the bitstream. For example, all weight matrix derivation modes select the first intra prediction mode; for another example, all weight matrix derivation modes select the second intra prediction mode; for another example, all minimum units corresponding to some weight matrix derivation modes select the first intra prediction mode, and all minimum units corresponding to some other weight matrix derivation modes select the second intra prediction mode.

The weight matrix derivation mode is a mode for deriving weight matrices. For a block with a given width and height, each weight matrix derivation mode may be used to derivate one weight matrix, and different weight matrix derivation modes may be used to derivate different weight matrices for the block of the same size. For example, in AVS3, AWP has 56 weight matrix derivation modes; in VVC, GPM has 64 weight matrix derivation modes.

In an exemplary embodiment, the operation that the same intra prediction mode is selected and stored for all minimum units corresponding to the entire block to be processed may include the following operation.

It is determined whether all the minimum units of the block to be processed store one of the two intra prediction modes or the other one of the two intra prediction modes based on a mode number of the weight matrix derivation mode obtained by parsing the bitstream. In an embodiment, whether all the minimum units of the block to be processed store the first intra prediction mode or the second intra prediction mode may be determined based on a mode number lookup table of the weight matrix derivation mode. For example, the embodiments of the disclosure use the same weight matrix derivation modes as those of the AWP, as shown in Table 1. All the minimum units corresponding to the weight matrix derivation modes with the mode number 0 in Table 1 may select the first intra prediction mode to store, and all the minimum units corresponding to the weight matrix derivation modes with the mode number 1 in Table 1 may select the second intra prediction mode to store.

TABLE 1

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 1 | 0 | 0 | 1 | 1 | 1 | 0 | 1 |
| 1 | 1 | 0 | 1 | 1 | 1 | 0 | 1 |

In an embodiment, a coding method is provided, including the following operations.

A target picture is obtained and block partitioning is performed on the target picture to obtain a block to be processed.

Intra prediction is performed on the block to be processed by using two or more different intra prediction modes, to obtain two or more prediction blocks corresponding to the different intra prediction modes; and a target prediction block of the block to be processed is obtained based on weight matrices and the obtained two or more prediction blocks.

Coding is performed based on the block to be processed and the target prediction block to generate a bitstream.

In another embodiment, a decoding method is provided, including the following operations.

A bitstream is parsed to obtain a block to be processed and weight matrices.

Intra prediction is performed on the block to be processed by using two or more different intra prediction modes, to obtain two or more prediction blocks corresponding to the different intra prediction modes.

A target prediction block of the block to be processed is obtained based on the weight matrices and the obtained two or more prediction blocks.

Decoding is performed based on the target prediction block and the block to be processed, to obtain a reconstruction block corresponding to the block to be processed.

An embodiment of the disclosure provides a computer readable storage medium, storing computer executable instructions for implementing the above intra prediction method or decoding method applicable to the decoder end.

An embodiment of the disclosure provides a computer readable storage medium, storing computer executable instructions for implementing the above intra prediction or coding method applicable to the encoder end.

An embodiment of the disclosure provides a decoder, including a memory and a processor. The memory stores instructions executable for a processor for implementing the operations of the above intra prediction method or decoding method applicable to the decoder end.

An embodiment of the disclosure provides an encoder, including a memory and a processor. The memory stores instructions executable for a processor for implementing the operations of the above intra prediction method or coding method applicable to the encoder end.

Figure 13:
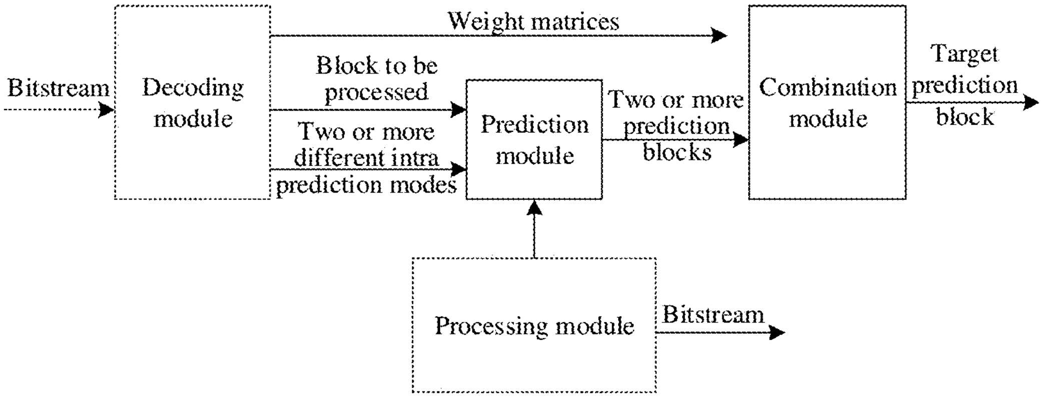
FIG. 13 is a schematic structural diagram of an intra prediction device according to an embodiment of the disclosure.

FIG. 13 is a schematic structural diagram of an intra prediction device according to the disclosure. As shown in FIG. 13, the device includes at least a prediction module and a combination module.

The prediction module is configured to perform intra prediction on a block to be processed by using two or more different intra prediction modes, to obtain two or more prediction blocks corresponding to the different intra prediction modes.

The combination module is configured to obtain a target prediction block of the block to be processed based on weight matrices and the obtained two or more prediction blocks.

The intra prediction device provided in this embodiment of the disclosure may be disposed in an encoder or a decoder.

The intra prediction device provided in this embodiment of the disclosure may be disposed in the decoder, and may further include a decoding module.

The decoding module is configured to decode a received bitstream to obtain the two or more different intra prediction modes, the block to be processed, and the weight matrices.

The intra prediction device provided in this embodiment of the disclosure may be disposed in the encoder, and may further include a processing module.

The processing module is configured to: try all or some possible combinations of prediction modes and weight matrix derivation modes, calculate loss costs and select a combination with a low loss cost; use two or more different intra prediction modes and weight matrices in the combination as the two or more different intra prediction modes and weight matrices for intra prediction; and write into a bitstream according to syntax, information about the determined two or more different intra prediction modes and weight matrix derivation modes.

In an exemplary embodiment, the two or more different intra prediction modes include at least one basic intra prediction mode.

In an exemplary embodiment, two different intra prediction modes are used to perform intra prediction on the block to be processed, and the two different intra prediction modes are both basic intra prediction modes.

In an exemplary embodiment, the used basic intra prediction mode may be further combined with an improved intra prediction mode to predict the block to be processed.

In an exemplary embodiment, two different intra prediction modes are used to predict the block to be processed, and the two different intra prediction modes include one basic intra prediction mode and one improved intra prediction mode.

In the embodiments of the disclosure, at least two different intra prediction modes are used for prediction of the block to be processed, such that the prediction of the block to be processed can be performed from multiple perspectives, which is suitable for the prediction of complex textures and facilitates to improve the quality of intra prediction.

In an exemplary embodiment, not each weight matrix in all the possible weight matrices has the same weight in all points. In other words, at least one of all the possible weight matrices includes at least two different weights.

In an exemplary embodiment, all the possible weight matrices include at least two different weights.

In an exemplary embodiment, at least one of all the possible weight matrices includes at least two different weights, and at least one of all the possible weight matrices includes only the same weights.

In an exemplary embodiment, intra prediction is performed on the block to be processed by using two different intra prediction modes, and only one of all the possible weight matrices includes only two types of weights, one type of weights indicates that a prediction value of a corresponding point is derived exclusively from a value of the corresponding point in the first prediction block, and the other type of weights indicates that a prediction value of a corresponding point is derived exclusively from a value of the corresponding point in the second prediction block.

In an exemplary embodiment, intra prediction is performed on the block to be processed by using two different intra prediction modes, and one of all the possible weight matrices includes a plurality of types of weights. A maximum weight and a minimum weight (e.g., 0) of the weights respectively indicate that prediction values of corresponding points are derived exclusively from values of the corresponding points in the first prediction block and from values of the corresponding points in the second prediction block; and a weight other than the maximum weight or the minimum weight indicates that a prediction value of a corresponding point is derived from a weighted average of values of the corresponding point in the first prediction block and the corresponding point in the second prediction block. An area consisting of the weights other than the maximum value or the minimum value may be referred to as a blending area.

In an exemplary embodiment, in all the possible weight matrices, if a weight matrix includes only two types of weights, positions at which the weights change form a straight line; if a weight matrix includes multiple types of weights, positions with the same weights in the blending area form a straight line. In an embodiment, the above-mentioned straight lines are all horizontal-vertical, or the above-mentioned straight lines are not all horizontal-vertical.

In an exemplary embodiment, in all the possible weight matrices, if a weight matrix includes only two types of weights, positions at which the weights change form a curve line; if a weight matrix includes multiple types of weights, positions with the same weights in the blending area form a curve line.

The diverse weight matrices provided in the embodiments of the disclosure guarantee the prediction of more diverse prediction blocks and enable the intra prediction method provided in the embodiments of the disclosure to be applicable to more scenarios.

In an exemplary embodiment, in the intra prediction device provided in this embodiment of the disclosure, the size of the block may satisfy, but is not limited to the following conditions.

A width of the block is greater than or equal to a first threshold TH1, a height of the block is greater than or equal to a second threshold TH2, and the first threshold TH1 and the second threshold TH2 may be 8, 16, 32, 64, 128, or the like. The first threshold TH1 may be equal to the second threshold TH2, for example, the first threshold TH1=the second threshold TH2=8. Alternatively, a number of pixels of the block is greater than or equal to a third threshold TH3, and the third threshold TH3 may be 8, 16, 32, 64, 128, or the like.

Alternatively, the width of the block is less than or equal to a fourth threshold TH4, the height of the block is less than or equal to a fifth threshold TH5, and the fourth threshold TH4 and the fifth threshold TH5 may be 8, 16, 32, 64, 128, or the like. The fourth threshold TH4 may be equal to the fifth threshold TH5. Alternatively, a number of pixels of the block is less than or equal to the sixth threshold TH6, and the sixth threshold TH6 may be 8, 16, 32, 64, 128, or the like.

By limiting the size of the blocks, the impact of the complexity due to use of multiple prediction modes for prediction on the overall system is reduced, and the trade-off between compression performance and complexity is well achieved by discarding some blocks of inapplicable sizes, thus better ensuring the applicability of the disclosure.

In an exemplary embodiment, the partitioning of blocks becomes increasingly flexible as technology evolves. In addition to square blocks, the partitioning method may also support blocks with aspect ratios such as 1:2, 1:4, 1:8, 2:1, 4:1, 8:1, or the like. In the intra prediction method provided in the embodiments of the disclosure, the inventors of the disclosure found that blocks with some aspect ratios, or blocks with some sizes, such as blocks with 1:4 or 4:1, 1:8 or 8:1, 8×32, 8×64, 32×8, or 64×8, may not bring good or significant compression performance. In an embodiment of the disclosure, the size of the block may be set by setting the aspect ratio of the block. For example, the ratio of width to height is less than or equal to a preset ratio threshold THR, and the ratio of width to height is less than or equal to the ratio threshold THR.

In an exemplary embodiment, the size of the block, and the aspect ratio of the block may be set simultaneously. For example, the intra prediction method provided in the embodiments of the disclosure may be used if the size of the block satisfies: the height of the block is greater than or equal to 8, the width of the block is greater than or equal to 8, the ratio of the width to the height of the block is less than or equal to 4, and the ratio of the height to the width of the block is less than or equal to 4; otherwise, the intra prediction method provided in the embodiments of the disclosure is not used by default.

In an exemplary embodiment, two different intra prediction modes are used to perform intra prediction on the block to be decoded, and the combination module may be specifically configured to: calculate a first product of a matrix corresponding to the first prediction block and the first weight matrix and a second product of a matrix corresponding to the second prediction block and the second weight matrix; calculate a sum of the first product, the second product and a preset value; and normalize the calculated sum to obtain the target prediction block.

In an exemplary embodiment, the intra prediction device provided in this embodiment of the disclosure may be disposed in the encoder, and the processing module may be further configured to: set a picture-level flag for indicating whether to use the intra prediction method in the embodiments of the disclosure for the current picture to be processed.

The decoding module in the decoder may be further configured to: determine, based on a flag, whether to proceed with performing intra prediction on the block to be processed by using the two or more different intra prediction modes obtained through decoding.

In an exemplary embodiment, the intra prediction device provided in this embodiment of the disclosure may be disposed in the encoder, and the processing module may be further configured to: set a flag below a picture level and above a CU level (for example, tile, slice, patch, or LCU), for indicating whether to use the intra prediction method in the embodiments of the disclosure for an indicated area.

Correspondingly, the decoding module in the decoder may be further configured to: determine, based on a flag, whether to proceed with performing intra prediction on the block to be processed by using the two or more different intra prediction modes obtained through decoding.

By setting different levels of flags in the embodiments of the disclosure, on one hand, the optimal configuration is flexibly realized according to different application scenarios and video contents, and on the other hand, the bit rate is further reduced.

In an exemplary embodiment, the intra prediction device provided in this embodiment of the disclosure may be disposed in the encoder, and the processing module may be further configured to set an improved prediction mode that is mutually exclusive with the intra prediction method provided in the embodiments of the disclosure.

Correspondingly, the decoding module in the decoder may be further configured to: parse the bitstream to obtain the improved prediction mode mutually exclusive with the intra prediction method provided in the embodiments of the disclosure; and if it is determined that the intra prediction method provided in the embodiments of the disclosure is used for the block to be processed, the mutually-exclusive improved prediction mode is not used; or, if it is determined that the mutually-exclusive improved prediction mode is used for the block to be processed, the intra prediction method of the embodiments of the disclosure is not used. By setting the mutually-exclusive improved prediction mode, it is not necessary to transmit a flag in the bitstream for indicating whether the mutually-exclusive improved prediction mode is used, such that unnecessary flag transmission in the bitstream is avoided and better compression performance is achieved in general.

In the embodiments, by setting the mutually-exclusive relationship between these improved prediction modes and the intra prediction of the disclosure, the trade-off between performance and complexity is well achieved, thus better ensuring the applicability of the disclosure.

In an exemplary embodiment, the combination module may be further configured to store intra prediction mode information used in the intra prediction, for use in a code process of a neighbouring block.

In an exemplary embodiment, two different intra prediction modes are used to perform intra prediction on the block to be processed, and the operation that the intra prediction modes used in intra prediction are stored may include the following operation.

At least one minimum unit stores one of the two different intra prediction modes, and at least one minimum unit stores the other one of the two different intra prediction modes. That is, at least two minimum units store different intra prediction modes.

In an exemplary embodiment, two different intra prediction modes are used to perform intra prediction on the block to be processed, and the intra prediction modes used in intra prediction are stored may include the following operation.

The same intra prediction mode is selected and stored for all minimum units corresponding to the entire block to be processed.

The decoder provided in the embodiments of the disclosure performs intra prediction on the block to be processed by using two or more different intra prediction modes respectively, to obtain two or more prediction blocks, and combines the obtained two or more prediction blocks based on the weight matrices to obtain the prediction block of the block to be processed. The embodiments of the disclosure use multiple intra prediction modes to determine multiple prediction blocks, thereby achieving prediction for complex textures, improving the quality of intra prediction, and thus improving compression performance.

Further, in the decoder provided in the embodiments of the disclosure, the prediction of more complex textures is guaranteed by diverse weight matrices. In this way, the quality of intra prediction is improved, and the compression performance is enhanced. In addition, the intra prediction method provided in the embodiments of the disclosure is applicable to more scenarios.

An embodiment of the disclosure further provides a decoder, including: a decoding module, a prediction module, and a combination module.

The decoding module is configured to decode a received bitstream, to obtain two or more different intra prediction modes, a block to be processed, and weight matrices.

The prediction module is configured to perform intra prediction on the block to be processed by using two or more different intra prediction modes, to obtain two or more prediction blocks corresponding to the different intra prediction modes.

The combination module is configured to obtain a target prediction block of the block to be processed based on the weight matrices and the obtained two or more prediction blocks.

In an exemplary embodiment, the decoding module may be further configured to determine, based on a picture-level flag, whether to proceed with performing intra prediction on the block to be processed by using the two or more different intra prediction modes obtained through decoding.

In an exemplary embodiment, the decoding module may be further configured to determine, based on a flag below a picture level and above a CU level, whether to proceed with performing intra prediction on the block to be processed by using the two or more different intra prediction modes obtained through decoding.

An embodiment of the disclosure further provides an encoder, including: a prediction module, a combination module, and a processing module.

The prediction module may be configured to perform intra prediction on a block to be processed by using two or more different intra prediction modes, to obtain two or more prediction blocks corresponding to the different intra prediction modes.

The combination module may be configured to obtain a target prediction block of the block to be processed based on weight matrices and the obtained two or more prediction blocks.

The processing module may be configured to: try all or some possible combinations of prediction modes and weight matrix derivation modes, calculate loss costs and select a combination with a low loss cost; use two or more different intra prediction modes and weight matrices in the combination as the two or more different intra prediction modes and weight matrices for intra prediction; and write the determined two or more different intra prediction modes, weight matrix derivation modes and other information into a bitstream according to syntax.

In an exemplary embodiment, the processing module may be further configured to set a flag.

The flag may be a picture-level flag for indicating a decoder whether to proceed with obtaining the two or more prediction blocks corresponding to the different intra prediction modes; and/or, the flag may be a flag below a picture level and above a CU level, for indicating a decoder whether to proceed with obtaining the two or more prediction blocks corresponding to the different intra prediction modes for an indicated area.

In an exemplary embodiment, the processing module may be further configured to: set a prediction mode mutually exclusive with the intra prediction; and skip using the mutually-exclusive prediction mode if the intra prediction is performed on the block to be processed; or skip performing the intra prediction if the mutually-exclusive prediction mode is used for the block to be processed.

In an exemplary embodiment, the combination module may be further configured to store intra prediction mode information used in the intra prediction.

Figure 14:
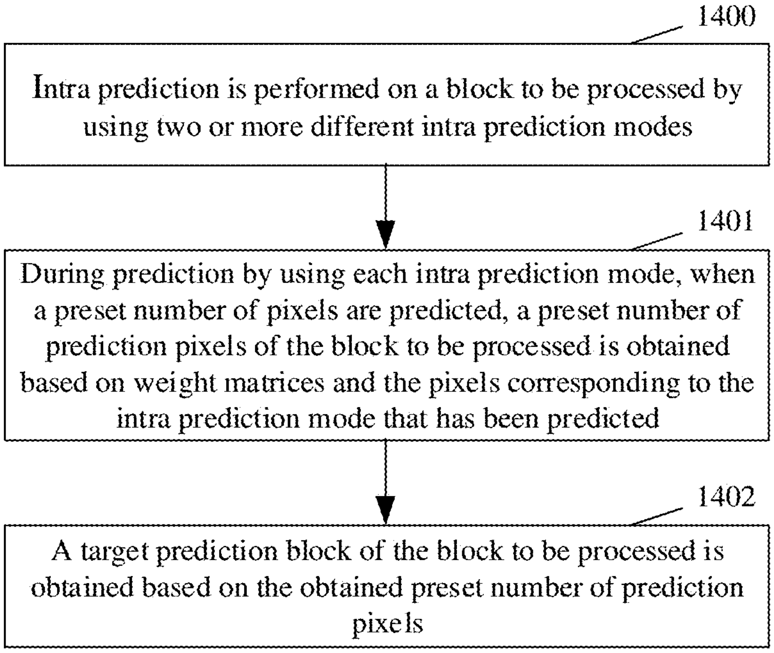
FIG. 14 is a schematic flowchart of another intra prediction method according to an embodiment of the disclosure.

FIG. 14 is a schematic flowchart of another intra prediction method according to an embodiment of the disclosure. As shown in FIG. 14, the method includes the following operations.

In 1400, intra prediction is performed on a block to be processed by using two or more different intra prediction modes, respectively.

In 1401, during prediction by using each intra prediction mode, when a preset number of pixels are predicted, a preset number of prediction pixels of the block to be processed are obtained based on weight matrices and the pixels corresponding to the intra prediction mode that has been predicted.

In 1402, a target prediction block of the block to be processed is obtained based on the obtained preset number of prediction pixels.

The difference between the intra prediction method provided in this embodiment and the embodiment shown in FIG. 7 is that the processed object in the embodiment shown in FIG. 7 is a block, while the processed object in the embodiment shown in FIG. 14 is a pixel. Similarly, in the embodiment shown in FIG. 14, intra prediction is performed on the block to be processed by using the two or more different intra prediction modes; when the preset number of pixels are predicted, the pixels corresponding to each intra prediction mode that has been predicted are combined based on weight matrices to obtain the preset number of prediction pixels of the block to be processed. Finally, the obtained preset number of prediction pixels are combined to obtain the prediction block of the block to be processed. In the embodiments of the disclosure, multiple prediction blocks are determined by using multiple intra prediction modes, thereby achieving prediction of complex textures. In this way, the quality of intra prediction is improved, and the compression performance is enhanced.

Further, the specific implementation of the weight matrices in the embodiment shown in FIG. 14 are same as that described in the embodiment shown in FIG. 7. The diverse weight matrices guarantee the prediction of more complex textures. In this way, the quality of intra prediction is improved, and the compression performance is enhanced. In addition, the intra prediction method provided in the embodiments of the disclosure is applicable to more scenarios.

A decoding embodiment is described below by taking the intra prediction method provided in the embodiments of the disclosure being applied in AVS3 as an example. Since AWP technology is used in AVS3, the intra prediction of the disclosure is referred to as spatial angular weighted prediction (SAWP) in this embodiment. Some terms in the AVS3 standard are used in this embodiment. For example, the prediction sample matrix in this embodiment is the prediction block above, that is, "block" can be understood as "sample matrix". For another example, the array in this embodiment is the matrix. This embodiment is performed by taking SAWP being applied to the luma component as an example, but the embodiments of the disclosure are not limited to the luma component, and may also be used for the chroma component and any other component of any format.

In this embodiment, in a manner, an encoder end may set a sequence-level flag to determine whether SAWP is performed on a current sequence to be decoded at the decoder end. A sequence_header is defined as in Table 2.

TABLE 2

| Sequence_header definition | Descriptor |
|---|---|
| sequence_header( ) { | |
| ...... | |
| sawp_enable_flag | u(1) |
| ...... | |

In Table 2, sawp_enable_flag is an SAWP enable flag, which is a binary variable. For example, a value of 1 indicates that the SAWP can be performed; a value of 0 indicates that SAWP cannot be performed.

In this embodiment, in another manner, the encoder end may set a picture-level flag to determine whether SAWP is performed on a current picture to be decoded at the decoder end. For example, it may be configured that SAWP is used for intra pictures (for example, I picture), but not used for inter pictures (for example, B picture and P picture). For another example, it may be configured that SAWP is used for intra pictures, but not used for inter pictures. For another example, it may be configured that SAWP is used for some inter pictures, but not used for some other inter pictures.

In this embodiment, in another manner, the encoder end may set a flag below a picture level and above a CU level (for example, tile, slice, patch, or LCU) to determine whether SAWP is used in an area at the decoder end.

It should be noted that the above flags may also be not set in this embodiment.

The decoder decodes the current CU and decodes the SAWP enable flag of the current CU if the current CU uses intra prediction; otherwise, the decoder does not need to decode the SAWP enable flag of the current CU. Since the information related to DT and IPF is mutually exclusive with SAWP, if the current CU uses SAWP, there is no need to process the information related to DT and IPF.

TABLE 3

```
        ......
        if (! DirectFlag && (mode == 'PRED_No_Constraint'))
          intra_cu_flag
      }
  }
  PartSize = 'SIZE_2Mx2N'
  If(SawpEnableFlag&&                    IntraCuFlag&&width>=SawpMinSize&&
height>=SawpMinSize&&width*SawpMaxRatio>=height&&height*SawpMaxRatio>=width){
      sawp_flag
  }
  if (DtEnableFlag && IntraCuFlag&&!SawpFlag) {
    dt_split_flag
  ......
```

SawpMinSize is a minimum value of length and width, and SawpMaxRatio is a maximum ratio of length to width.

In Table 3, sawp_flag indicates an SAWP flag, which is a binary variable. For example, a value of 1 indicates that the SAWP is performed and a value of 0 indicates that the SAWP is not performed. The value of SawpFlag is equal to the value of sawp_flag. If there is no sawp_flag in the bitstream, the value of SawpFlag is 0.

The value of SawpEnableFlag in Table 3 is equal to the value of sawp_enable_flag in Table 2. If there is no sawp_enable_flag in the bitstream, the value of SawpEnableFlag is 0.

In this embodiment, assuming that SAWP is used for the current CU, weight matrix derivation modes and two intra prediction modes need to be decoded (two intra prediction modes are used as an example in this embodiment). In this embodiment, for example, the weight matrix derivation mode reuses the weight matrix derivation mode of AWP, and the decoding of the two intra prediction modes of SAWP reuses the decoding of the intra prediction modes in related art.

TABLE 4

```
......
if ((SawpFlag) {
  sawp_idx
  intra_luma_pred_mode0
  intra_luma_pred_mode1
}
......
```

In Table 4, sawp_idx indicates an index for the SAWP mode, which is used to determine a weight matrix for SAWP, and a value of SawpIdx is equal to a value of sawp_idx. If there is no sawp_idx in the bitstream, the value of SawpIdx is 0.

In Table 4, intra_luma_pred_mode0 indicates a first luma prediction mode of the SAWP, which is used to determine the first intra prediction mode for the luma block of the SAWP; intra_luma_pred_mode1 indicates a second luma prediction mode of the SAWP, which is used to determine the second intra prediction mode for the luma block of the SAWP.

In an embodiment, the parsing method for sawp_idx may be the same as that for awp_idx in the related art, the parsing method for intra_luma_pred_mode0 may be the same as that for intra_luma_pred_mode in the related art, and the parsing method for intra_luma_pred_mode1 may be the same as that for intra_luma_pred_mode in the related art.

In an embodiment, the parsing method for intra_luma_pred_mode1 may further include the following. If both intra_luma_pred_mode0 and intra_luma_pred_mode1 use the MPM, intra_luma_pred_mode1 does not need to be decoded to determine whether it is the first intra prediction mode or the second intra prediction mode of the MPM. That is, the second intra prediction mode is determined based on the information about the decoded first intra prediction mode. Because the MPM in AVS3 has only two intra prediction modes, if intra_luma_pred_mode0 uses one of the intra prediction modes, intra_luma_pred_mode1 uses the other intra prediction mode by default.

The binarization method of intra_luma_pred_mode0 is shown in Table 5. The value of 0 or 1 of intra_luma_pred_mode0 indicates whether the MPM is used. Specifically, if the first binary symbol of the binary symbol string is "1", it indicates that the MPM is used, and the first binary symbol is "0", it indicates that the MPM is not used. If the first binary symbol indicates MPM, the second binary symbol of the binary symbol string indicates which MPM is used.

TABLE 5

| Intra_luma_pred_mode0 | Binary symbol string |
|---|---|
| 0 | 10 |
| 1 | 11 |
| 2 | 0 . . . |
| . . . | . . . |

The binarization method for intra_luma_pred_mode1 is shown in Table 6. The value 0 or 1 of intra_luma_pred_mode1 indicates whether the MPM is used. Specifically, if the first binary symbol of the binary symbol string is "1", the second binary symbol is no longer needed. If the value of intra_luma_pred_mode0 is 1, the value of intra_luma_pred_mode1 is 0. If the value of intra_luma_pred_mode0 is 0, the value of intra_luma_pred_mode1 is 1.

TABLE 6

| Intra_luma_pred_mode1 | Binary symbol string |
|---|---|
| 0 | 1 (and intra_luma_pred_mode0 is 1) |
| 1 | 1 (and intra_luma_pred_mode0 is 0) |
| 2 | 0 . . . |
| . . . | . . . |

Another embodiment for parsing the bitstream structure and decoding is described by taking the intra prediction method provided in the embodiments of the disclosure being applied in AVS3 as an example.

A decoder decodes the current CU, and if the current CU uses intra prediction, decodes the DT and IPF enable flags of the current CU, as well as the unique luma prediction mode intra_luma_pred_mode for each prediction unit in the current intra prediction method.

If the current CU does not use DT nor IPF, the SAWP enable flag of the current CU is decoded. If the current CU uses SAWP, the weight matrix derivation mode and one intra prediction mode intra_luma_pred_mode1 are decoded, and the decoded intra_luma_pred_mode is used as intra_luma_pred_mode0.

TABLE 7

```
 . . . . . .
 dt__split__flag
 . . . . . .
 intra__luma__pred__mode
 . . . . . .
 ipf__flag
 . . . . . .
 If(SawpEnableFlag&&    !    DtSplitFlag    &&!IpfFlag    &&
IntraCuFlag&&width>=SawpMinSize&&
height>=SawpMinSize&&width*SawpMaxRatio>=height&&height*SawpMaxR
atio>=width){
   sawp__flag
 }
 if ((SawpFlag) {
   sawp__idx
   intra__luma__pred__mode1
 }
 . . . . . .
```

IntraLumaPredMode0 and IntraLumaPredMode1 are determined based on intra_luma_pred_mode0 and intra_luma_pred_mode1, respectively, further to determine intra prediction sample matrices predMatrix0 and predMatrix1.

The weight matrix SawpWeightArrayY is determined based on SawpIdx, and an input index is SawpIdx.

A new prediction sample matrix predMatrixSawp is determined based on the two intra prediction sample matrices predMatrix0 and predMatrix1, and the determined weight matrix SawpWeightArrayY. The following operation is included.

The value of the element predMatrixSawp[x][y] in the prediction sample matrix predMatrixSawp for the SAWP mode is ((predMatrix0[x][y]*AwpWeightArrayY[x][y]+predMatrix1[x][y]*(8−AwpWeightArrayY[x][y])+4)>>3).

After the prediction block of SAWP, that is, the prediction sample matrix predMatrixSawp for the SAWP mode is determined, the subsequent processing may further include: decoding, inverse transformation and inverse quantization on the quantization coefficients to determine a residual block, combination of the residual block and the prediction block into a reconstruction block, and subsequent loop filtering. The specific implementation is not used to limit the scope of protection of the disclosure and details are not repeated here.

The intra prediction mode storage method of SAWP in this embodiment may be similar to the motion information storage method of AWP, but the input index is replaced with SawpIdx and the output intra prediction reference mode (interPredAwpRefMode) is replaced with sawpRefMode. If sawpRefMode of a 4×4 block is 0, IntraLumaPredMode0 is stored; otherwise, sawpRefMode of the 4×4 block is 1, and IntraLumaPredMode1 is stored.

Since the first version of AVS3 only supports 34 intra prediction modes, the 34th mode (having an index number 33 if the index starts from 0) is PCM mode. More intra prediction modes are added in the second version of AVS3, expanding to 66 intra prediction modes. The second version, in order to be compatible with the first version, does not change the original decoding method of intra_luma_pred_mode, but proposes: if intra_luma_pred_mode is greater than 1, another flag needs to be added, as shown in Table 8, that is, the luma intra prediction mode expansion flag eipm_pu_flag.

TABLE 8

```
intra_luma_pred_mode
if (EipmEnableFlag && intra_luma_pred_mode > 1) {
eipm_pu_flag
}
```

The luma intra prediction mode expansion flag eipm_pu_flag is a binary variable. If a value of eipm_pu_flag is 1, it indicates that the angular intra prediction expansion mode should be used. If a value of eipm_pu_flag is 0, it indicates that the luma intra prediction expansion mode is not used. The value of EipmPuFlag is equal to the value of eipm_pu_flag. If there is no eipm_pu_flag in the bitstream, the value of EipmPuFlag is 0.

Therefore, referring to the text description of the second version of AVS3, the syntax intra_luma_pred_mode, intra_luma_pred_mode0, and intra_luma_pred_mode1 in the above embodiments should all be followed by eipm_pu_flag, eipm_pu_flag0, and eipm_pu_flag1 as in Table 8. Moreover, IntraLumaPredMode0 is determined based on intra_luma_pred_mode0 and eipm_pu_flag0, and IntraLumaPredMode1 is determined based on intra_luma_pred_mode1 and eipm_pu_flag1.

In the embodiments of the disclosure, in embodiments that do not use PCM modes, or embodiments that use only the first 33 or 34 modes of the first version, there is no need to transmit eipm_pu_flag.

Those skilled in the art should know that the modules or operations of the disclosure may be implemented by a universal computing device, and these modules or operations may be concentrated on a single computing device or distributed on a network consisting of a plurality of computing devices, and may optionally be implemented by programmable codes executable by the computing devices, so that these modules or operations may be stored in a storage device for execution with the computing devices, and in some circumstances, the shown or described operations may be performed in sequences different from those described here, or the modules or operations may be made into integrated circuit modules respectively, or multiple modules or operations thereof may be made into a single integrated circuit module. Therefore, the disclosure is not limited to any specific hardware and software combination.

The above is merely preferred embodiments of the disclosure and not intended to limit the disclosure, and various changes and modifications of the disclosure may be made by those skilled in the art. Any modifications, equivalent replacements, improvements, and the like made within the spirit and principle of the disclosure shall fall within the scope of protection of the disclosure.

The invention claimed is:

1. An intra prediction method, applicable to a decoder, and comprising:

performing intra prediction on a block to be processed by using two or more different intra prediction modes, to obtain two or more prediction blocks corresponding to the different intra prediction modes; and obtaining a target prediction block of the block to be processed based on weight matrices and the obtained two or more prediction blocks;

wherein the intra prediction modes comprise a first intra prediction mode and a second intra prediction mode different from the first intra prediction mode, the prediction blocks comprise a first prediction block corresponding to the first intra prediction mode and a second prediction block corresponding to the second intra prediction mode, and the weight matrices comprise a first weight matrix and a second weight matrix; wherein the first intra prediction mode comprise one or more of: a direct current (DC) mode, a planar mode, a plane mode, a bilinear mode, and an angular prediction mode, the second intra prediction mode comprises one of: improving a sub-pixel interpolation of a reference pixel, or filtering a prediction pixel; and obtaining the target prediction block of the block to be processed based on the weight matrices and the obtained two or more prediction blocks comprises:

calculating a first product of the first prediction block and the first weight matrix and calculating a second product of the second prediction block and the second weight matrix;

calculating a sum of the first product, the second product and a preset value of 4; and right shifting the calculated sum by a preset number of bits to obtain the target prediction block;

wherein the second weight matrix is a difference between a maximum weight and the first weight matrix.

2. The intra prediction method according to claim 1, wherein before obtaining the two or more prediction blocks corresponding to the different intra prediction modes, the method further comprises:

parsing a bitstream to obtain the two or more different intra prediction modes, the block to be processed, and the weight matrices.

3. The intra prediction method according to claim 1, wherein the maximum weight is 8, and the preset number of bits is 3.

4. The intra prediction method according to claim 1, wherein at least one of all possible weight matrices comprises at least two different weights.

5. The intra prediction method according to claim 4, wherein one of all the possible weight matrices comprises a plurality of types of weights, wherein a maximum weight and a minimum weight of the weights respectively indicate that prediction values of corresponding points are derived exclusively from a value of the corresponding point in the first prediction block and a value of the corresponding point in the second prediction block; and a weight other than the maximum weight and the minimum weight indicates that a prediction value of a corresponding point is derived from a weighted average of values of the corresponding point in the first prediction block and the second prediction block.

6. The intra prediction method according to claim 1, wherein a width and a height of the block to be processed or the target prediction block comprise:

the width is greater than or equal to a first threshold TH1 and the height is greater than or equal to a second threshold TH2; or the width is less than or equal to a fourth threshold TH4 and the height is less than or equal to a fifth threshold TH5;

wherein the first threshold TH1 is equal to the second threshold TH2, and the first threshold TH1 is 8.

7. The intra prediction method according to claim 1, further comprising:

storing intra prediction mode information used in the intra prediction method;

wherein storing the intra prediction modes used in the intra prediction method comprises:

storing different intra prediction modes in at least two minimum units.

8. The intra prediction method according to claim 1, wherein one of the two intra prediction modes first intra prediction mode and the second intra prediction mode is determined based on information about the other intra prediction mode;

wherein the first intra prediction mode and the second intra prediction mode use a most probable mode (MPM).

9. The intra prediction method according to claim 1, wherein before obtaining the two or more prediction blocks corresponding to the different intra prediction modes, the method further comprises:

parsing a bitstream to obtain a flag, wherein the flag is a coding unit (CU) level flag for indicating whether to proceed with obtaining the two or more prediction blocks corresponding to the different intra prediction modes.

10. A decoder, comprising a processor, configured to:

decode a received bitstream, to obtain two or more different intra prediction modes, a block to be processed, and weight matrices;

perform intra prediction on the block to be processed by using the two or more different intra prediction modes, to obtain two or more prediction blocks corresponding to the different intra prediction modes; and obtain a target prediction block of the block to be processed based on the weight matrices and the obtained two or more prediction blocks;

wherein the intra prediction modes comprise a first intra prediction mode and a second intra prediction mode different from the first intra prediction mode, the prediction blocks comprise a first prediction block corresponding to the first intra prediction mode and a second prediction block corresponding to the second intra prediction mode, and the weight matrices comprise a first weight matrix and a second weight matrix; wherein the first intra prediction mode comprise one or more of: a direct current (DC) mode, a planar mode, a plane mode, a bilinear mode, and an angular prediction mode, the second intra prediction mode comprises one of: improving a sub-pixel interpolation of a reference pixel, or filtering a prediction pixel; and the processor is further configured to:

calculate a first product of the first prediction block and the first weight matrix and calculate a second product of the second prediction block and the second weight matrix;

calculate a sum of the first product, the second product and a preset value of 4; and right shift the calculated sum by a preset number of bits to obtain the target prediction block;

wherein the second weight matrix is a difference between a maximum weight and the first weight matrix.

11. The decoder according to claim 10, wherein the processor is further configured to: parse a bitstream to obtain a flag, wherein the flag is a coding unit (CU) level flag for indicating whether to proceed with obtaining the two or more prediction blocks corresponding to the different intra prediction modes.

12. An intra prediction method, applicable to an encoder and comprising:

performing intra prediction on a block to be processed by using two or more different intra prediction modes, to obtain two or more prediction blocks corresponding to the different intra prediction mode; and obtaining a target prediction block of the block to be processed based on weight matrices and the obtained two or more prediction blocks;

wherein the intra prediction modes comprise a first intra prediction mode and a second intra prediction mode different from the first intra prediction mode, the prediction blocks comprise a first prediction block corresponding to the first intra prediction mode and a second prediction block corresponding to the second intra prediction mode, and the weight matrices comprise a first weight matrix and a second weight matrix; wherein the first intra prediction mode comprise one or more of: a direct current (DC) mode, a planar mode, a plane mode, a bilinear mode, and an angular prediction mode, the second intra prediction mode comprises one of: improving a sub-pixel interpolation of a reference pixel, or filtering a prediction pixel; and obtaining the target prediction block of the block to be processed based on the weight matrices and the obtained two or more prediction blocks comprises:

calculating a first product of the first prediction block and the first weight matrix and calculating a second product of the second prediction block and the second weight matrix;

calculating a sum of the first product, the second product and a preset value of 4; and right shifting the calculated sum by a preset number of bits to obtain the target prediction block;

wherein the second weight matrix is a difference between a maximum weight and the first weight matrix.

13. The intra prediction method according to claim 12, wherein before obtaining the two or more prediction blocks corresponding to the different intra prediction modes, the method further comprises:

setting a flag, wherein the flag is a coding unit (CU) level flag for indicating a decoder whether to proceed with obtaining the two or more prediction blocks corresponding to the different intra prediction modes.

* * * * *